United States Patent
Frolov et al.

(10) Patent No.: US 8,461,504 B1
(45) Date of Patent: Jun. 11, 2013

(54) METHODS FOR OPTICAL RESTRICTING INCLUDING A PHOTORESTRICTOR FOR PRODUCING AND TRANSFERRING PHOTOEXCITATIONS(AS AMENDED)

(75) Inventors: Sergey V. Frolov, New Providence, NJ (US); Michael Cyrus, Summit, NJ (US); Allan J. Bruce, Scotch Plains, NJ (US)

(73) Assignee: Sunlight Photonics Inc., South Plainfield, NJ (US)

( * ) Notice: Subject to any disclaimer, the term of this patent is extended or adjusted under 35 U.S.C. 154(b) by 301 days.

(21) Appl. No.: 13/018,272

(22) Filed: Jan. 31, 2011

(51) Int. Cl.
*G01J 1/32* (2006.01)

(52) U.S. Cl.
USPC ........................................ 250/205; 250/208.1

(58) Field of Classification Search
USPC ............... 250/205, 208.1, 214 R, 214.1, 239, 250/458.1, 483.1, 472.1, 580; 257/79–97; 315/501–503; 313/483–485, 498
See application file for complete search history.

(56) References Cited

U.S. PATENT DOCUMENTS 7,800,123 B2 * 9/2010 Bechtel et al. .................. 257/98

\* cited by examiner

*Primary Examiner* — Que T Le
(74) *Attorney, Agent, or Firm* — Moser Taboada; Alan Taboada

(57) ABSTRACT

Methods for optical restricting are described. An example of the invention relates to a method of restricting the brightness of a light source. The method can include: absorbing, in absorber material of a photo-restrictor, at least a portion of a primary emission produced by the light source; producing first photoexcitations in the absorber material characterized by a first excitation density; transferring the first photoexcitations from the absorber material to an emitter material of the photo-restrictor thereby producing second photoexcitations characterized by a second excitation density; and producing a secondary emission from the emitter material.

21 Claims, 19 Drawing Sheets

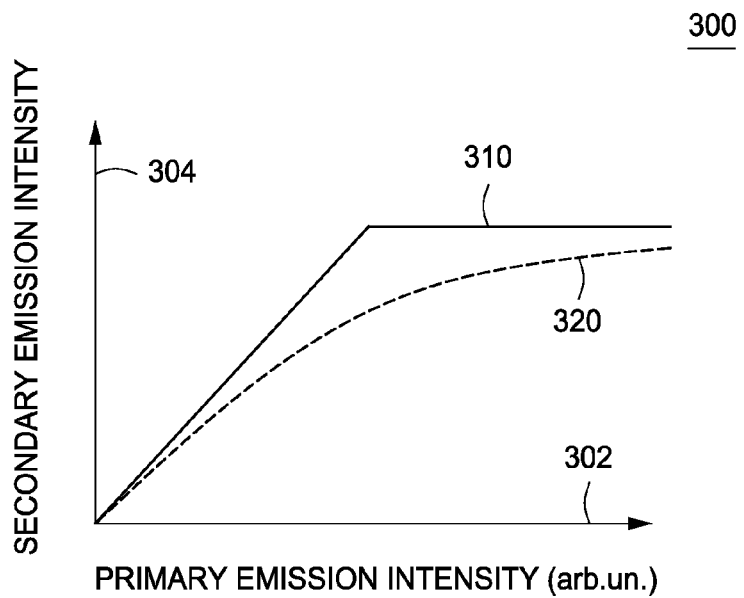
FIG. 3
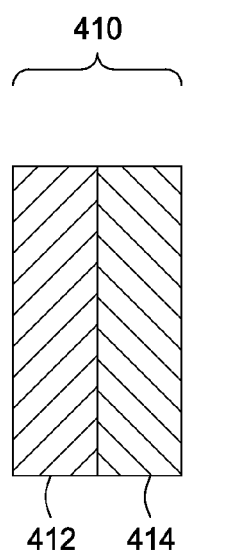 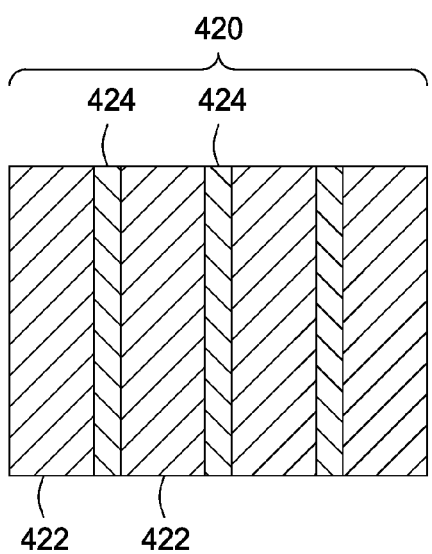 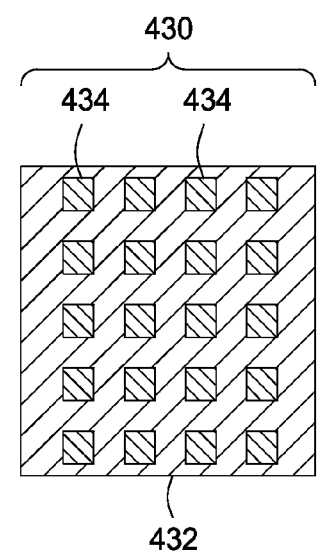
FIG. 4A  FIG. 4B  FIG. 4C

METHODS FOR OPTICAL RESTRICTING INCLUDING A PHOTORESTRICTOR FOR PRODUCING AND TRANSFERRING PHOTOEXCITATIONS(AS AMENDED)

BACKGROUND

1. Field

The present invention relates generally to controlling electro-magnetic radiation, and particularly to methods for restricting power and intensity of light in optical sensors.

2. Related Art

Modern optical systems suffer from the lack of visibility near the line-of-sight to bright objects in the sky, such as the sun or the moon. When the sun enters the field-of-view of a camera, the sunlight may saturate and potentially damage optical sensors in the camera. This problem is sometimes solved by means of a coronagraph, which is an apparatus used in astronomy to mechanically block light from a bright star in order to detect a nearby faint source. However, such a complex actively tracking mechanism typically is not applicable to existing commercial cameras and optical systems. A better approach may involve a device that acts as a non-linear optical broadband filter and provides necessary masking effect for sensors at high optical powers and intensities.

The ability of a material or device to lower the transmission of incoming light is known as optical limiting. An ideal limiter exhibits a linear transmission below a threshold and afterwards clamps its output to a constant level. Approaches to achieve this effect have been based on the use of both active and passive devices. Active devices rely on feedback loops, which control an aperture allowing either greater or smaller amounts of light to pass through it. Because of electronics that is required to drive such systems, they are generally too slow, complex and expensive. Passive devices that exploit the nonlinear optical susceptibility of a given substance to incoming light have been considered more suitable, because their response can be ultrafast. This effect can be achieved by one or more of the nonlinear optical mechanisms, such as excited state absorption (ESA), free-carrier absorption (FCA), two photon absorption (TPA), thermal defocusing/scattering, photo-refraction, nonlinear refraction, and induced scattering. Optical limiting can be enhanced by coupling two or more of the nonlinear optical mechanisms. A wide range of materials with various nonlinear optical mechanisms contributing to optical limiting and nonlinear absorption have been investigated, primarily for the purpose of protecting against high power laser beams. To date, no single material has been found that can provide the required protection levels for any of the optical systems against high power lasers.

The requirements for optical limiting against natural high brightness objects, such as the sun and the moon, are even more demanding. Optical intensities, which are required to produce nonlinear effects (ESA, TPA, etc.), can be achieved in high power pulsed lasers, but are far above those that are produced by the sun (or the moon). Passive optical limiters that have been in development for protection against pulsed lasers therefore cannot be used as means for high brightness protection. Thus, a dramatically new approach is needed as an alternative method to optical limiting, being able provide the same functionality.

SUMMARY

An embodiment of the invention relates to a method of restricting the brightness of a light source. The method can include: absorbing, in absorber material of a photo-restrictor, at least a portion of a primary emission produced by the light source; producing first photoexcitations in the absorber material characterized by a first excitation density; transferring the first photoexcitations from the absorber material to an emitter material of the photo-restrictor thereby producing second photoexcitations characterized by a second excitation density; and producing a secondary emission from the emitter material.

Another embodiment of the invention relates to a method of modifying the response of an optical sensor. The method can include: providing an optical sensor characterized by a first response function; providing a photorestrictor, wherein the photorestrictor absorbs at least a fraction of a primary emission emitted by a light source and converts the primary emission as absorbed into a secondary emission, the photorestrictor being characterized by a transfer function such that secondary emission intensity saturates at increasing primary emission intensity; transferring the secondary emission to the optical sensor; and providing a second response function of the optical sensor, wherein the second response function is the product of the first response function and the photorestrictor transfer function.

Another embodiment of the invention relates to a method of producing a nonlinear image of a light source. The method can include: collecting a primary emission produced by the light source and producing a first image of the light source on a first surface of a photorestrictor, wherein the primary emission includes a first intensity; absorbing at least a portion of the primary emission and producing photoexcitations in the photorestrictor; converting the photoexcitations in the photorestrictor and producing a secondary emission from a second surface of the photorestrictor; and transferring the secondary emission and producing a second image of the light source on an optical sensor; wherein the secondary emission includes a second intensity that has a nonlinear dependence on the first intensity.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein:

FIG. 3 shows limiting transfer functions.

FIG. 4 shows three different photorestrictor embodiments.

DETAILED DESCRIPTION

In the following detailed description, numerous specific details are set forth in order to provide a thorough understanding of exemplary embodiments or other examples described herein. However, it will be understood that these embodiments and examples may be practiced without the specific details. In other instances, well-known methods, procedures, components and circuits have not been described in detail, so as not to obscure the following description. Further, the embodiments disclosed are for exemplary purposes only and other embodiments may be employed in lieu of, or in combination with, the embodiments disclosed.

Figure 1:
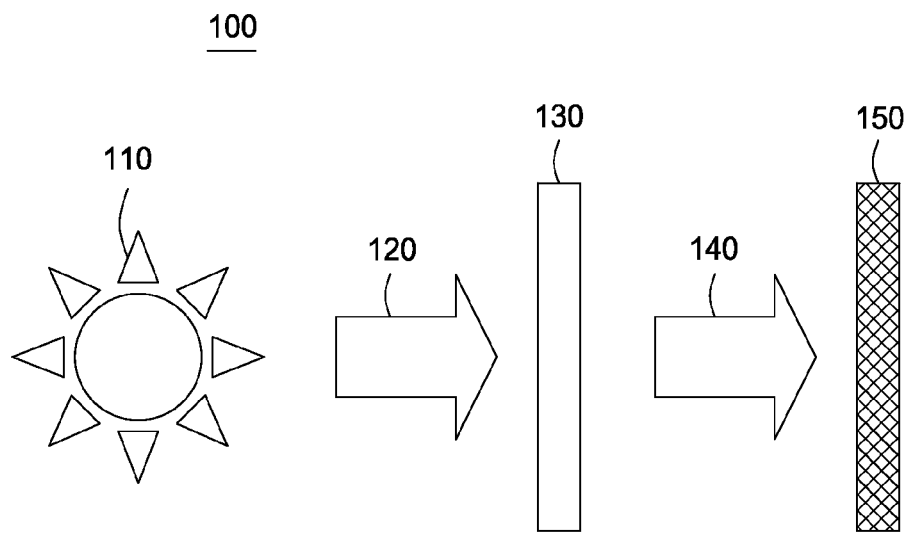
FIG. 1 shows the basic concept of a photorestricting method.

FIG. 1 depicts an arrangement 100 for restricting the amount of light transmitted from a light source to an optical sensor according to embodiments of the invention. A light source 110 produces a primary emission 120. The light source 110 may be an active light source, such as the sun, stars, light bulbs, lasers, light emitting diodes (LED) and others, which can internally generate their own emission 120. Alternatively, the light source 110 may be a passive light source, such as the moon, planets, satellites, people, animals, inanimate objects and many others, which produce the emission 120 by reflecting light from active light sources nearby. At least a part of the primary emission 120 may be intercepted by a photo-restrictor 130. Subsequently, the photo-restrictor 130 produces a secondary emission 140, which is then detected by an optical sensor 150. The sensor 150 may be an optical detector, an infrared (IR) detector, a focal plane arrays (FPA), a charge-coupled device (CCD), an active pixel sensor (APS), a thermal imaging device or other devices used for sensing and detecting photons. The spectrum of secondary emission 140 overlaps at least partially with the spectral responsivity range of the optical sensor 150. The photo-restrictor 130 provides means for optical conversion from the primary emission 120 to the secondary emission 140, in which the secondary emission intensity depends on the primary emission intensity via a transfer function.

Figure 2:
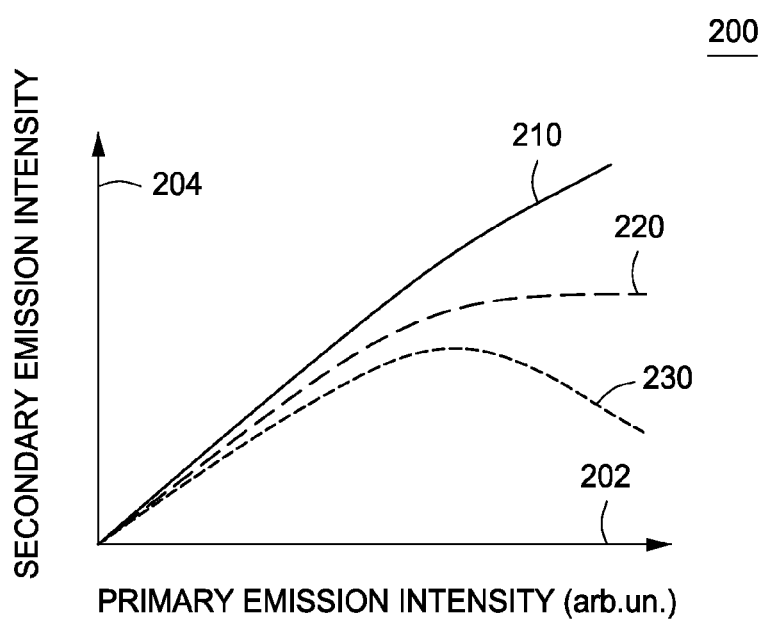
FIG. 2 shows photorestricting transfer functions.

FIG. 2 depicts a graph 200 showing exemplary transfer functions relating the secondary emission intensity and the primary emission intensity. The graph 200 includes an x-axis 202 showing the primary emission intensity in arbitrary units, and a y-axis 204 showing the secondary emission intensity in arbitrary units. As a result of the optical conversion provided by the photo-restrictor 130, this conversion process may be self-limiting and optically restricting, so that amount of light reaching the sensor 150 may not exceed a safe limit. Various transfer functions may be envisioned between the primary and secondary emissions, some of which (210, 220 and 230) are shown in FIG. 2. These photo-restricting transfer functions may be monotonic (210 and 220) and non-monotonic (230). The amount of the secondary emission 140 may be restricted, where the optical restriction may be defined as the deviation of the transfer function from the linear dependence between the primary and secondary emission intensities, e.g. via a gradual lowering of the slope of the transfer function at larger intensities. In addition, the maximum amount of the secondary emission 140 may be limited or capped. For example, a transfer function may be weakly or partially restricting, such as the curve 210 showing a sublinear dependence of the secondary emission intensity on the intensity of the primary emission. A transfer function may also be strongly restricting or limiting, such as the curve 220, where the secondary emission intensity cannot exceed a certain maximum value. Also, a non-monotonic transfer function illustrated by the curve 230 may be characterized by at least one maximum and a decreasing second emission intensity at large primary emission intensities.

FIG. 3 depicts a graph 300 showing exemplary transfer functions relating the secondary emission intensity and the primary emission intensity. The graph 300 includes an x-axis 302 showing the primary emission intensity in arbitrary units, and a y-axis 304 showing the secondary emission intensity in arbitrary units. Furthermore, as shown in FIG. 3 limiting transfer functions may be characterized by hard limiting (curve 310) and soft limiting (curve 320), where the former may exhibit a kink. The exact shape of the transfer function is driven by the requirements of the application and may be in turn determined by the design of the photo-restrictor 130. At least two important characteristics of the photo-restrictor transfer function can be emphasized. One such characteristic feature is the quantum efficiency of the photo-restrictor at low primary emission intensities, which is given by the ratio of the primary emission photon flux to the secondary emission photon flux. This parameter also determines the slope of the transfer function at low intensities. A restricting transfer function may thus be also defined as a transfer function characterized by an intensity-dependent quantum efficiency, so that the quantum efficiency at higher primary emission intensities may be lower than that at lower primary emission intensities. Another significant characteristic feature is the secondary emission saturation intensity, i.e. the maximum intensity of the secondary emission that can be achieved for large primary emission intensities. This feature is important for matching the photo-restrictor to a specific sensor or an optical imaging system.

In accordance with embodiments of the invention, a method and an apparatus are provided to produce a photo-restrictor. The photo-restrictor is a device, providing a mechanism for restricted optical conversion of a primary emission from a light source to a secondary emission that is subsequently detected by a sensor (e.g., the photo-restrictor 130 shown in FIG. 1). The conversion process is intensity-dependent, so that the fraction of the primary emission converted into the secondary emission decreases at high primary emission intensities and thus becomes restricted. A photo-restrictor may comprise at least two parts: an absorber section and an emitter section.

FIGS. 4A-C show schematic diagrams depicting photo-restrictors according to embodiments of the invention. In FIG. 4A. a photo-restrictor 410 includes an absorber 412 and an emitter 414 that are attached to each other. In FIG. 4B, a photo-restrictor 420 comprises multiple absorber (422) and emitter (424) sections that are attached to each other in alternating sequence. By way of example, four absorber 422 and three emitter 424 sections are shown, but the photo-restrictor 420 can include more or less such sections. In FIG. 4C, a photo-restrictor 430 comprises multiple emitter sections 434 embedded in an absorber section 432. Of course, other variations of the photo-restrictor designs with similar functionalities are possible within the scope of this invention. The absorber and emitter sections may be attached and connected so that a transfer of photo-excitations in the form of excited state energy or charge carriers may occur between them. These sections may be laminated, glued, bonded, grown, hot-pressed, fused, intermixed or otherwise put together to form a single photo-restrictor. Several specific materials may be used to make absorber and emitter sections as described below.

Figure 5:
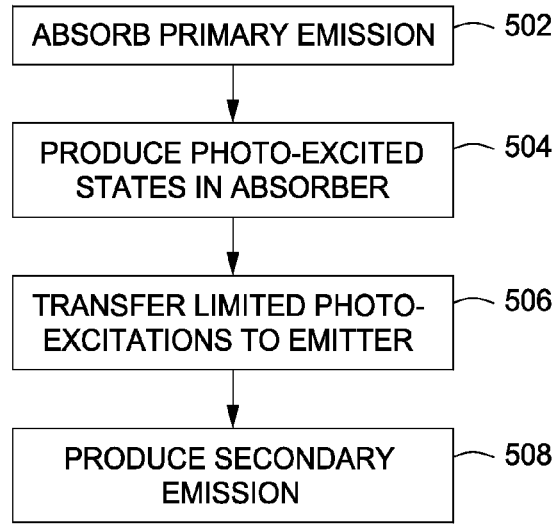
FIG. 5 shows a general photorestricting method.

FIG. 5 depicts a flow diagram showing a method for photo-restricting and optical limiting based on the photo-restrictor approach according to embodiments of the invention. The method 500 begins at step 502, where a primary emission is absorbed by the photo-restrictor. At step 504, photo-excited states (are produced in an absorber of the photo-restrictor (also referred to as photoexcitations). At step 506, the excited states are transferred to an emitter of the photo-restrictor. At step 508, a secondary emission is produced by the photo-restrictor. In the method 500, the primary emission (e.g. such as the emission 120 of FIG. 1) is at least partly absorbed by the absorber (e.g. such as the absorber 412 of FIG. 4A). This optical absorption process then produces photo-excited states in the absorber (step 504). Subsequently, at least some of the photo-excited states are transferred to the emitter (e.g. such as the emitter 414 of FIG. 4A). The photo-excited states in the emitter are then used to produce the secondary emission (e.g. such as the emission 140 shown in FIG. 1). In general, the photo-excited states may be neutral or charged, localized or delocalized. In some materials, excitons may be produced that are neutral and localized. In other materials, charged carriers may be photo-generated that are charged and delocalized.

Figure 6A:
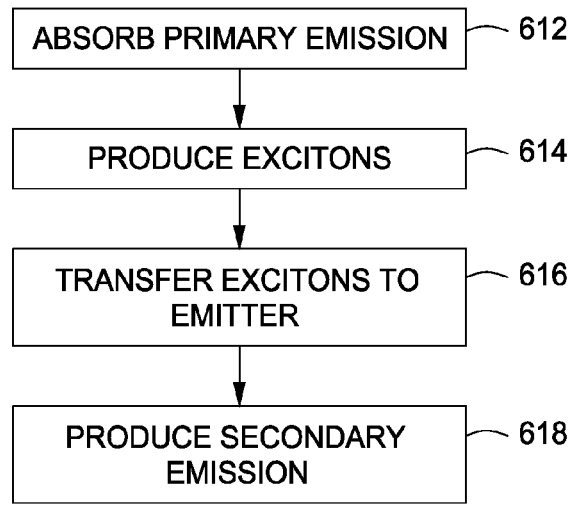
FIG. 6 shows two different version of a photorestricting method.

Depending on the nature of the photo-excited states, at least two further embodiments extending the method 500 are possible. FIG. 6A shows a flow diagram depicting another method 610 for photo-restricting and optical limiting based on the photo-restrictor approach according to embodiments of the invention. The method 610 begins at step 612, where a primary emission is absorbed by the photo-restrictor. At step 614, excitons are produced in an absorber of the photo-restrictor. At step 616, the excitons are transferred to an emitter of the photo-restrictor. At step 618, a secondary emission is produced by the photo-restrictor. The method 610 utilizes the photo-restrictor based on excitonic materials, in which the photo-excited states may be excitons. Exemplary excitonic materials include molecular, organic, polymer, π-conjugated polymer and other materials, in which at least some of the excited states (such as the lowest excited states) may be described as excitonic states or excitons.

Figure 6B:
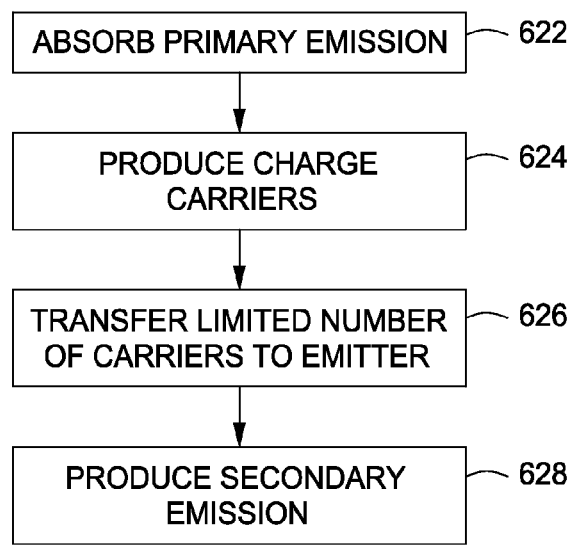

FIG. 6B shows a flow diagram depicting another method 620 for photo-restricting and optical limiting based on the photo-restrictor approach according to embodiments of the invention. The method 620 begins at step 622, where a primary emission is absorbed by the photo-restrictor. At step 624, charge carriers are produced in an absorber of the photo-restrictor. At step 626, the charge carriers are transferred to an emitter of the photo-restrictor. At step 628, a secondary emission is produced by the photo-restrictor. The method 620 utilizes the photo-restrictor based on electronic materials (semiconductor materials), in which the photo-excited states may be charge carriers, such as electrons and holes. Exemplary electronic materials may include bulk and nanostructured semiconductors, in which at least some of the excited states are charged carriers, such as electrons and holes.

Figure 7:
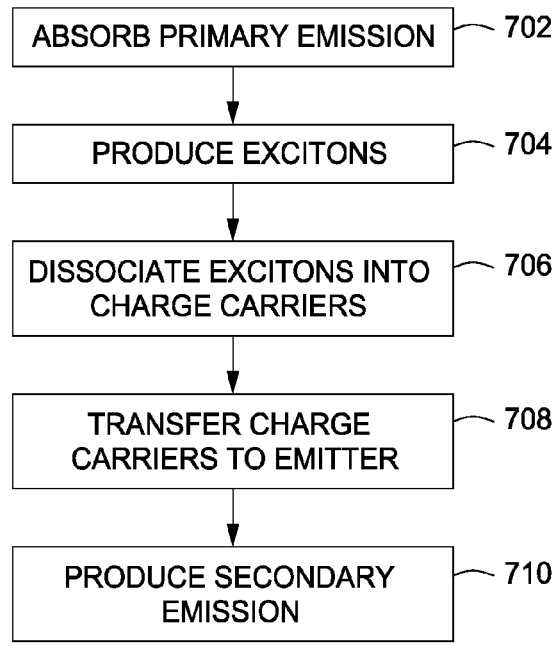
FIG. 7 shows another photorestricting method.

Other variations and modifications of the method 500 are possible that are within the scope of this invention. For example, FIG. 7 shows a method 700 for photo-restricting and optical limiting based on the photo-restrictor approach according to embodiments of the invention. The method 700 begins at step 702, where a primary emission is absorbed by the photo-restrictor. At step 704, excitons are produced in an absorber of the photo-restrictor. At step 706, the excitons are disassociated into charge carriers. At step 708, the charge carriers are transferred to an emitter of the photo-restrictor. At step 710, a secondary emission is produced by the photo-restrictor. The method 700 may utilize a photo-restrictor based on both excitonic and electronic materials.

Figure 8:
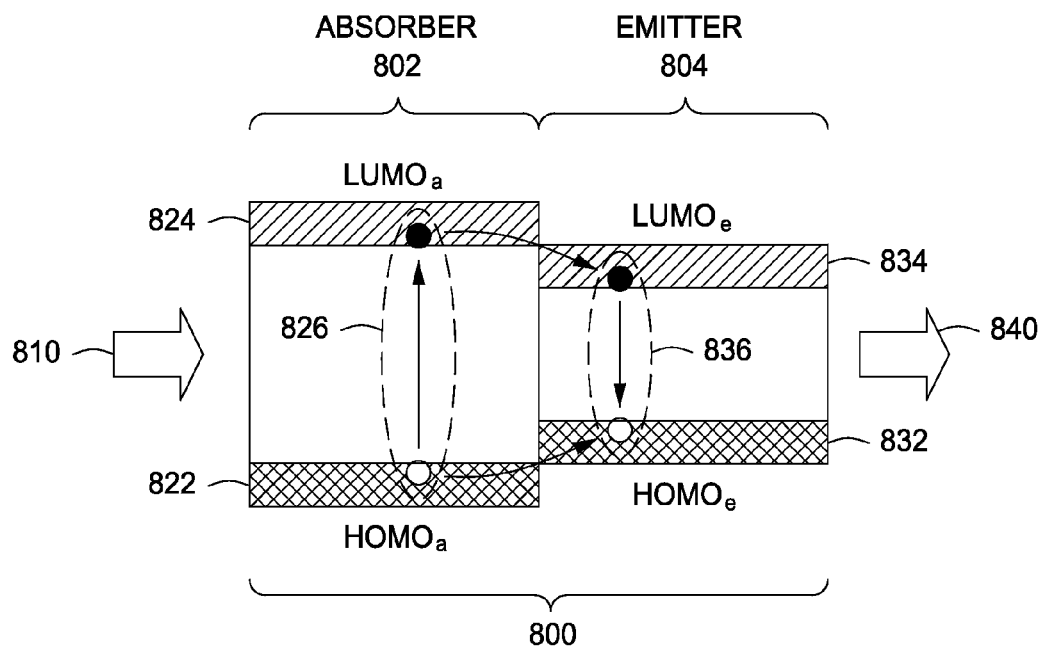
FIG. 8 shows the electronic level diagram of a molecular photorestrictor.

Some of the embodiments of the photo-restrictor described above may be based on molecular, organic, polymer, π-conjugated polymer and other materials, in which at least some of the excited states (e.g. the lowest excited states) may be described as excitonic states or excitons. FIG. 8 is a schematic diagram showing a photo-restrictor 800 according to embodiments of the invention. The photo-restrictor 800 can be made from excitonic materials noted above and some of the electronic states corresponding to the excited and ground states in its absorber and emitter sections. The ground state is typically designated as the highest occupied molecular orbital (HOMO), whereas the lowest excited state is typically referred to as the lowest unoccupied molecular orbital (LUMO). An absorber 802 is characterized by $HOMO_a$ 822 and $LUMO_a$ 824, the separation between which determines an optical absorption gap $E_{ab}$ in the absorber material. Similarly, an emitter 804 is characterized by $HOMO_e$ 832 and $LUMO_e$ 834, the separation between which determines an optical absorption gap $E_{em}$ in the emitter material. The absorber 802 and emitter 804 materials may be different, so that $E_{ab} > E_{em}$. Absorption of a photon from a primary emission 810 produces a neutral localized excited state 826 in the absorber 802 material—an exciton. This exciton may then diffuse into the absorber section 802 producing a lower-energy exciton 836 in the emitter 804. Due to its lower energy state, this exciton remains confined in the emitter section 804. The emitter 804 exciton can decay radiatively, thus emitting a photon and producing a secondary emission 840.

The absorber 802 and emitter 804 sections in FIG. 8 may be produced in a number of different ways, some of which are illustrated in FIGS. 4A-C and described above. For example, some absorber or emitter sections may be produced as thin layers shown in FIGS. 4A and 4B. The absorber and emitter sections may also take other forms and shapes such thin rods, dots, clusters, shells, clumps, nodules and other 3-dimensional structures, as illustrated in FIG. 4C.

Figure 9:
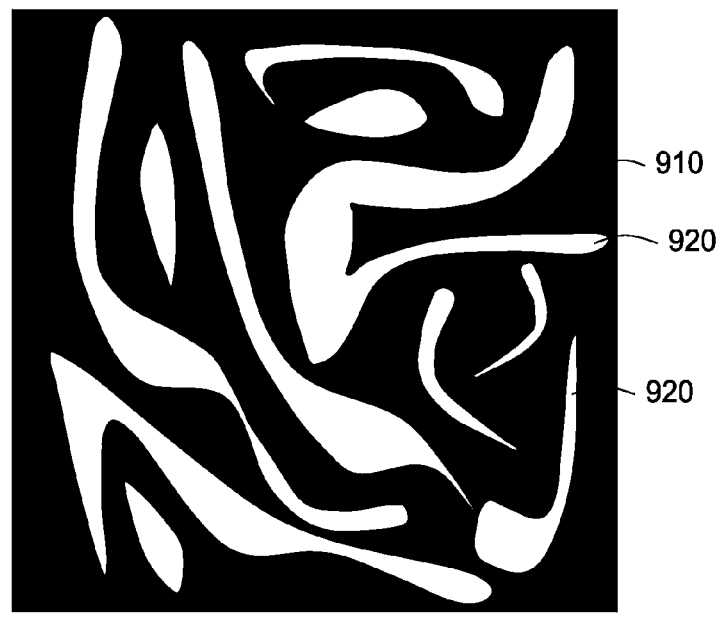
FIG. 9 shows a photorestrictor made of a mixture of absorber and emitter materials.

FIG. 9 is a schematic diagram showing another photo-restrictor 900 according to embodiments of the invention. In the photo-restrictor 900, the absorber and emitter sections may be also intermixed forming a uniform composition, in which the absorber and emitter parts (sections 910 and 920, respectively) occupy relatively small and interconnected regions of space. In this case at least one of these sections may contain single or multiple molecules of a corresponding material and have a characteristic dimension (e.g. a width of a strand or a diameter of a grain) of less than a micrometer, or less than 100 nanometers thus forming a nanostructure.

Figure 10:
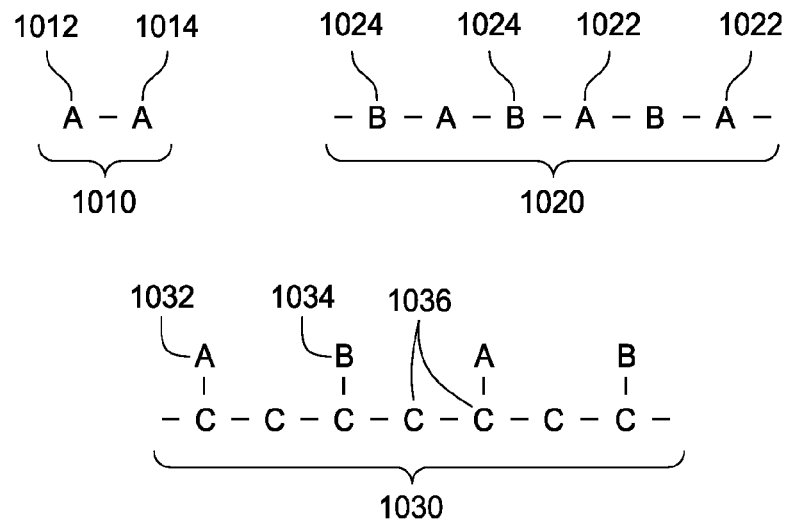
FIG. 10 shows chemical structures of molecular photorestrictor materials.

At the extreme, a single large molecule, a copolymer or a functionalized polymer may be produced, which may be composed of at least two interconnected molecular groups able to function independently from each other as the absorber and an emitter, respectively. For example, FIG. 10 shows a single molecular complex 1010 comprising at least two molecular groups 1012 and 1014 having at least one chemical bond between them. In this case the group 1012 may function as the absorber and the group 1014 may function as the emitter. The excited state energy transfer between the absorber and the emitter may occur via the chemical bond between these groups, a Forster transfer, a quantum-mechanical tunneling or other means. In addition, other molecular groups may be included in the molecular complex 1010 to enhance either its absorption, emission or the energy transfer, or additionally perform other functions. FIG. 10 also shows a copolymer 1020 comprising at least two repeating units 1022 and 1024 forming a polymer chain. The copolymer 1020 may be an alternating copolymer, a periodic copolymer, a random copolymer, a block copolymer, a branch copolymer or other copolymers. In this case the group 1022 may function as the absorber and the group 1024 may function as the emitter. The excited state energy transfer between the absorber and the emitter may also occur for example via the chemical bond between these groups or via the Forster transfer. In addition, other molecular groups may be included in the copolymer 1020 to enhance either its absorption, emission or the energy transfer, or additionally perform other functions. Furthermore, FIG. 10 shows a functionalized polymer 1030 comprising at least two functional units 1032 and 1034 that are attached to a backbone polymer chain formed by repeating units 1036. In this case the group 1032 may function as the absorber and the group 1034 may function as the emitter. The excited state energy transfer between the absorber and the emitter may occur for example via the backbone polymer chain or via the Forster transfer. In addition, other molecular groups may be included in the polymer 1030 to enhance either its absorption, emission or the energy transfer, or additionally perform other functions.

Figure 11:
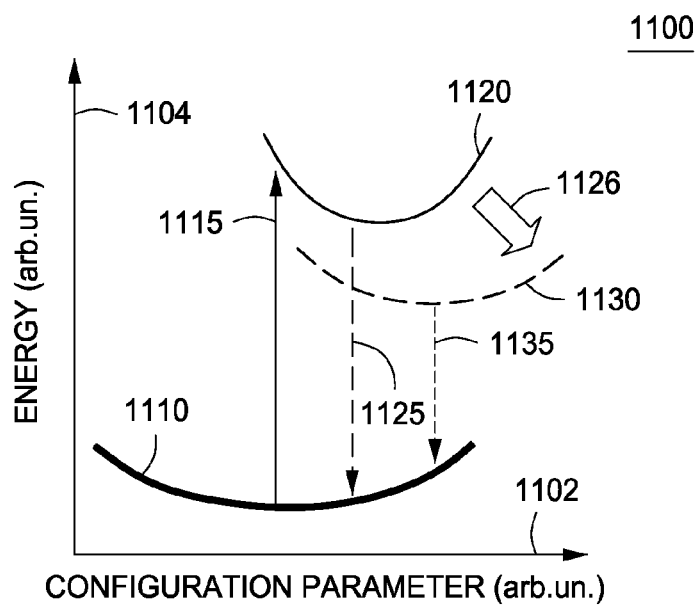
FIG. 11 shows a configuration coordinate diagram of excited states in a molecular photorestrictor material.

It is also possible to produce the absorber and emitter sections of a photo-restrictor using the same organic, molecular or polymer material. FIG. 11 for example the lowest energy states in the configuration coordinate diagram 1100 of a molecule, characterized by a ground state 1110 and the first excited state 1120. The diagraph 1100 includes an x-axis 1102 representing the configuration parameter in arbitrary units, and a y-axis 1104 representing energy in arbitrary units. The excited state 1120 may be produced via a photon absorption process 1115. The radiative relaxation of the excited state 1120 may then occur via a radiative transition 1125 back to the ground state 1110 with the production of secondary emission. The radiative transition 1125 is Stokes-shifted with respect to the transition 1115, so that the wavelength of the emitted photon (secondary emission) is longer than the wavelength of the absorbed original photon (primary emission). Also, the excited state 1120 may change its configuration into a different excited state 1130 via transition 1126 accompanied by changes in the structure, size or other configuration parameters of this molecule. For example, the $2^{nd}$ excited state 1130 may be the triplet excited state of the molecule. The excited state 1130 may then relax radiatively to the ground state via a transition 1135 by emitting a secondary emission photon. The Stokes shift in this case is even more pronounced, i.e. there is a larger difference between the wavelengths of absorbed and emitted photons (primary and secondary emissions).

Figure 12:
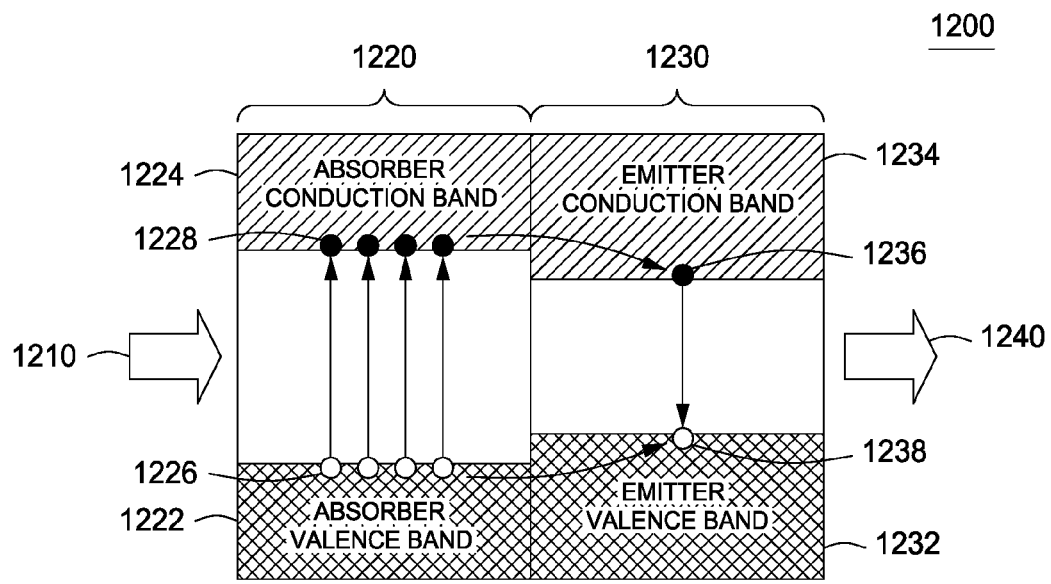
FIG. 12 shows the electronic band diagram of semiconductor-based photorestrictor materials.

Embodiments of a photo-restrictor may also be based on electronic materials, such as semiconductors, in which at least some of the excited states are charged carriers, such as electrons and holes, where the hole is defined an electron vacancy. FIG. 12 shows schematically a photo-restrictor 1200 made from semiconductors and some of the electronic states corresponding to the valence and conduction bands in its absorber 1220 and emitter 1230 sections. The absorber 1220 is characterized by the valence band 1222 and the conduction band 1224, the separation between which determines an optical bandgap $E_{ab}$ in the absorber material. Similarly, the emitter is characterized by valence band 1232 and the conduction band 1234, the separation between which determines an optical bandgap $E_{em}$ in the emitter material. The absorber and emitter materials may be different, so that $E_{ab} > E_{em}$. Absorption of a photon from a primary emission 1210 produces a hole 1226 in the valence band 1222 and an electron 1228 in the conduction band 1224. These electron and hole may then diffuse into the absorber section producing a lower energy electron 1236 and a lower energy hole 1238 in the emitter. Due to their lower energy state, these electron and hole remain confined in the emitter section and eventually recombine radiatively, emitting a photon and thus producing a secondary emission 1240.

The absorber and emitter sections in FIG. 12 may be produced in a number of different ways as illustrated in FIGS. 4A-C. The electronic materials needed to produce the absorber and emitter may be crystalline, polycrystalline, nanocrystalline or amorphous. They can be grown by epitaxy, physical vapor deposition, chemical vapor deposition or other known techniques used for deposition of electronic and semiconductor materials. In addition, these materials can be deposited using non-vacuum processing techniques, such as screen printing, ink printing, chemical bath deposition and others, typically followed by sintering or annealing processing steps. The absorber and emitter sections may each take different physical shapes, such as thick wafers, thin films, wires, rods, spheres, shells, disks, cubes, cylinders, and other geometrically regular and irregular shapes. If one or more characteristic dimensions in these variously shaped sections are less than 1 μm, or even less than 100 nm, the electronic properties of a corresponding nanostructured material may be altered. As a result, new quantized electronic states can be created having well-controlled properties, such as energy levels, effective masses, carrier mobilities, densities, recombination rates, etc. For example, a very thin semiconductor film may be used to produce a quantum well; a very thin cylinder may used to produce a quantum wire; and a very small sphere or a cube may used to produce a quantum dot. Quantum wells, wires and dots may be particularly preferred in producing the emitter sections, because these quantum structures increase the radiative recombination rate and thus raise the conversion efficiency.

Figure 13:
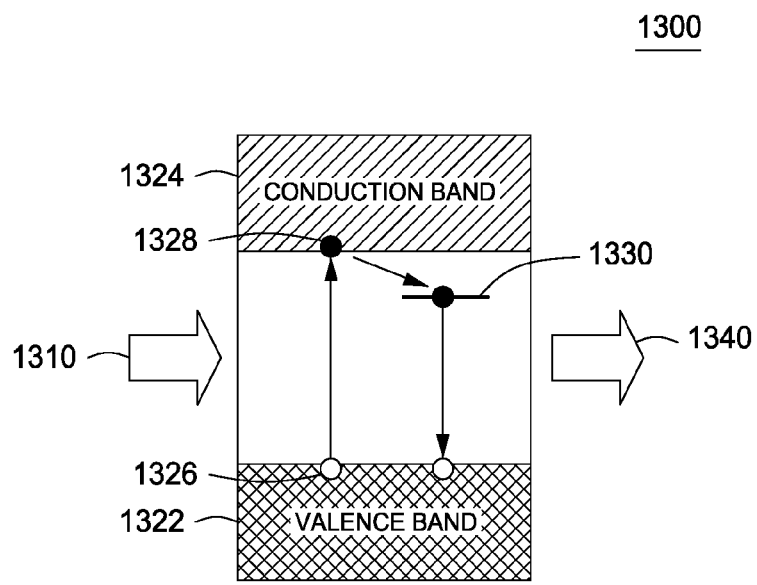
FIG. 13 shows the electronic band diagram of doped semiconductor-based photorestrictor materials.

It is also possible to produce the absorber and emitter sections using the same semiconductor material. In this case the wavelength shift between the absorption and emission bands is provided within a single semiconductor material. For example, FIG. 13 shows a semiconductor 1300, which the absorption of a primary emission 1310 occurs via an optical transition between its valence band 1322 and conduction band 1324 subsequently generating a hole 1326 and an electron 1328. In addition, the semiconductor 1300 may be doped with impurity atoms, such as donors, acceptors or isoelectronic impurities, producing a localized intragap state 1330. A specific location of the intragap state may be different from the one shown in FIG. 13 and its position in general depends on the type of the impurity atom. A photo-generated electron may be trapped at the impurity, from where it may recombine radiatively producing secondary emission 1340. In this case the emitter function is accomplished by the semiconductor impurity.

In accordance with embodiments of the invention, a photo-restricting method and a photorestrictor apparatus are provided in which the primary emission from a light source is converted to a secondary emission via a transfer function of the types shown in FIG. 2. It may be preferred that the optical spectrum of thus produced secondary emission is different from the spectrum of the primary emission. It may be also that the spectral bandwidth of the secondary emission is smaller than the bandwidth of the primary emission. Furthermore, the spectral bandwidth of the absorption band of the photorestrictor absorber section can be larger than the spectral bandwidth of the emission band of the photorestrictor emitter section. In addition, the average or mean wavelength of the secondary emission can be longer than the average or mean wavelength the absorbed primary emission.

Figure 14:
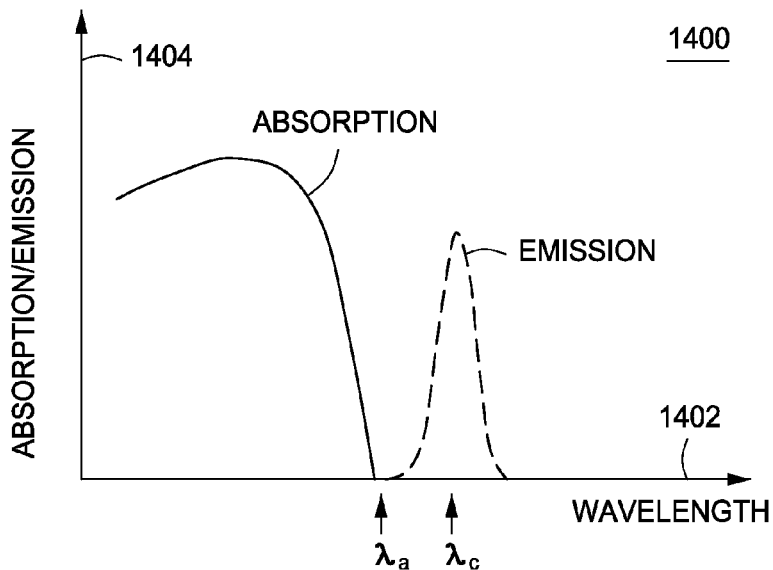
FIG. 14 shows the absorption and emission spectra of an absorber and an emitter, respectively.

For example, FIG. 14 shows a graph 1400 depicting the absorption spectrum of an absorber and the emission spectrum of an emitter. The graph 1400 includes an x-axis 1402 representing wavelength, and a y-axis 1404 representing absorption/emission. The absorption spectrum in general may be described by various spectral shapes similar to or different from the absorption spectrum shown in FIG. 14 and also characterized by the absorption cut-off wavelength $\lambda_a$. Primary emission with the wavelength at or shorter than $\lambda_a$ is absorbed, while the remaining primary emission at longer wavelengths is not absorbed by the absorber. Similarly, the emission spectrum in general may be described by various spectral shapes similar to or different from the emission spectrum shown in FIG. 14 and also characterized by the peak wavelength $\lambda_e$. It may be preferred that $\lambda_e > \lambda_a$, so that the emission band of the emitter does not spectrally overlap the absorption band of the absorber.

The photoexcitation density in general is not uniform across the absorber volume, since the absorption of the primary emission is not uniform as a function of the absorber thickness. A higher excitation density may be obtained at the front surface of the absorber; therefore, more pronounced nonlinear effects, such as a nonlinear increase in recombination rates, can be produced close to the front surface of the absorber. Correspondingly, the distribution of multiple emitter sections across the absorber volume may also be nonuniform, so that the emitter density decreases at larger distances from the absorber front surface.

Figure 15:
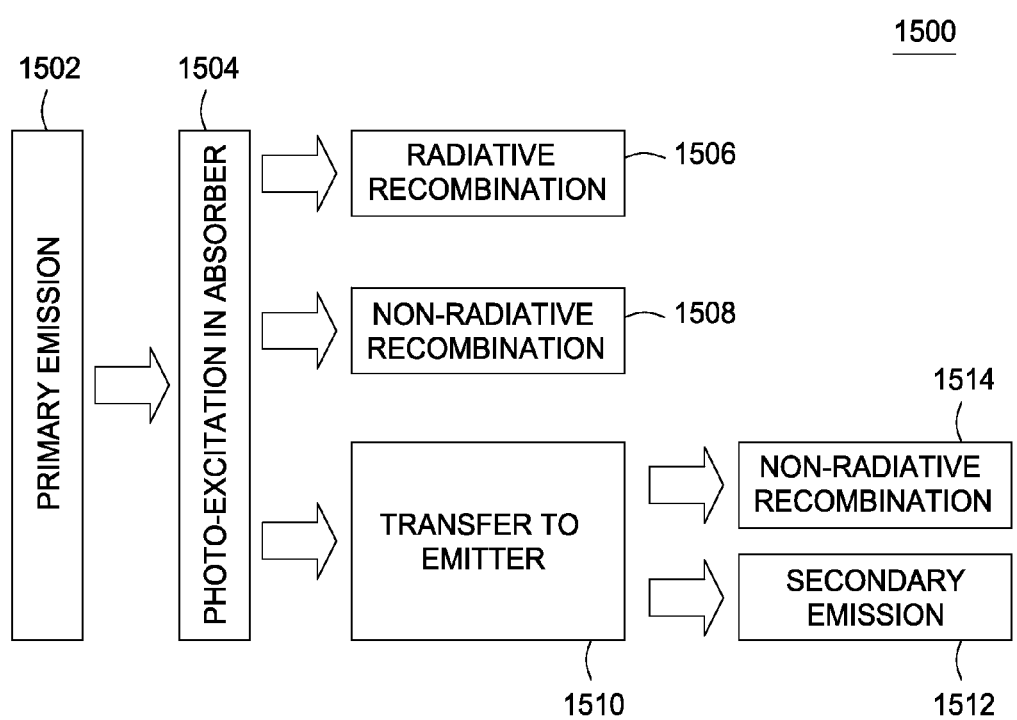
FIG. 15 shows the conversion process from the primary emission to the secondary emission.

In accordance with embodiments of the invention, a method for photo-restricting and optical limiting based on the photo-restrictor approach is provided. FIG. 15 illustrates an embodiment of a photo-restricting method 1500. At step 1502, a primary emission is absorbed. At step 1504, a photo-excited state or a photoexcitation is produced in an absorber. The photoexcitation produced in step 1504 may then relax via radiative recombination (step 1506), non-radiative recombination (step 1508) and energy transfer (step 1510) to an emitter. The energy transfer to the emitter results in the creation of an excited state in the emitter, which in turn may relax via radiative (step 1512) or non-radiative (step 1514) recombination. In addition, some energy may be transferred from the emitter back to the absorber via quantum tunneling (not shown in FIG. 15). Only the radiative recombination path contributes to the production of a secondary emission. The relative rates of each relaxation path may be different from each other and depend on the material choice and photo-restrictor design used in this approach. At low primary emission intensities, the energy transfer from the absorber to the emitter can be more frequent compared to the radiative and non-radiative recombination. At low primary emission intensities, the radiative recombination can be favored against the non-radiative recombination, i.e. the radiative recombination rate is higher than the non-radiative recombination rate.

Figure 16:
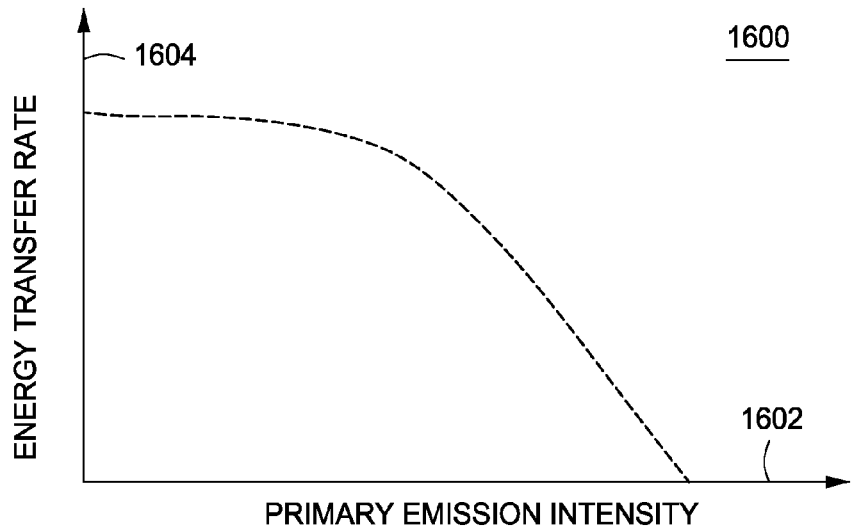
FIG. 16 shows schematically the intensity dependence of the energy transfer rate.

Alternatively, at high primary emission intensities, the energy transfer from the absorber to the emitter can be disfavored against the radiative and non-radiative recombination, i.e. the rate of energy transfer at high intensities is lower in comparison to the rate of energy transfer at low intensities as shown in FIG. 16. FIG. 16 shows a graph 1600 having an x-axis 1602 representing the primary emission intensity, and a y-axis 1604 representing energy transfer rate. Similarly, at high primary emission intensities, the radiative recombination rate can be lower in comparison to that at low intensities. As a result, a photo-restricting effect characterized by the saturation of the secondary emission at high intensities with a transfer function of the types shown in FIG. 2 may be achieved.

As noted above, photo-generated excited states in the absorber or the emitter of a photo-restrictor may be excitons. Different approaches may be utilized in this case to attain the secondary emission saturation at high intensities. For example, the volume of the emitter section may be selected to be much smaller than that of the absorber, which may limit the number of available exciton states in the emitter. As a result, the maximum secondary emission intensity will be determined by the emitter emission under full excitation conditions, i.e. when its lowest excited states across its full volume are completely occupied and the emitter medium is thus optically inverted. Photo-generated excited states in the absorber or the emitter also may be charged carriers.

Figure 17:
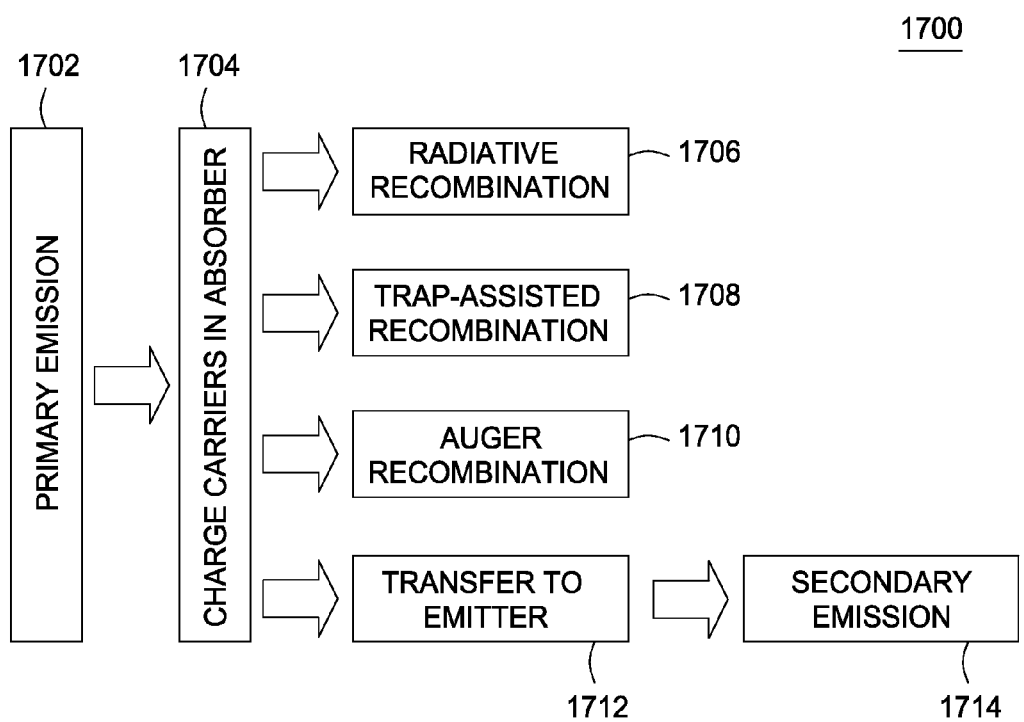
FIG. 17 shows the conversion process from the primary emission to the secondary emission in semiconductor materials at low primary emission intensities.

FIG. 17 illustrates another embodiment of a photo-restricting method 1700. The photo-restricting method 1700 begins at step 1702, where a low-intensity primary emission is first absorbed. At step 1704, charged carriers are produced in an absorber. These charge carriers may recombine via radiative recombination (step 1706), non-radiative trap-assisted radiation (step 1708), non-radiative Auger recombination (step 1710), and charge transfer to an emitter (step 1712). The charge transfer to the emitter results in the creation of an electron-hole pair in the emitter, which in turn may recombine via either radiative or non-radiative recombination. In addition, some electrons and holes may be transferred from the emitter back to the absorber via quantum tunneling albeit with small probability (not shown in FIG. 17). Only the radiative recombination path contributes to the production of a secondary emission (step 1714). The relative rates of each recombination path may be different from each other and depend on the intensity of the primary emission.

Figure 18:
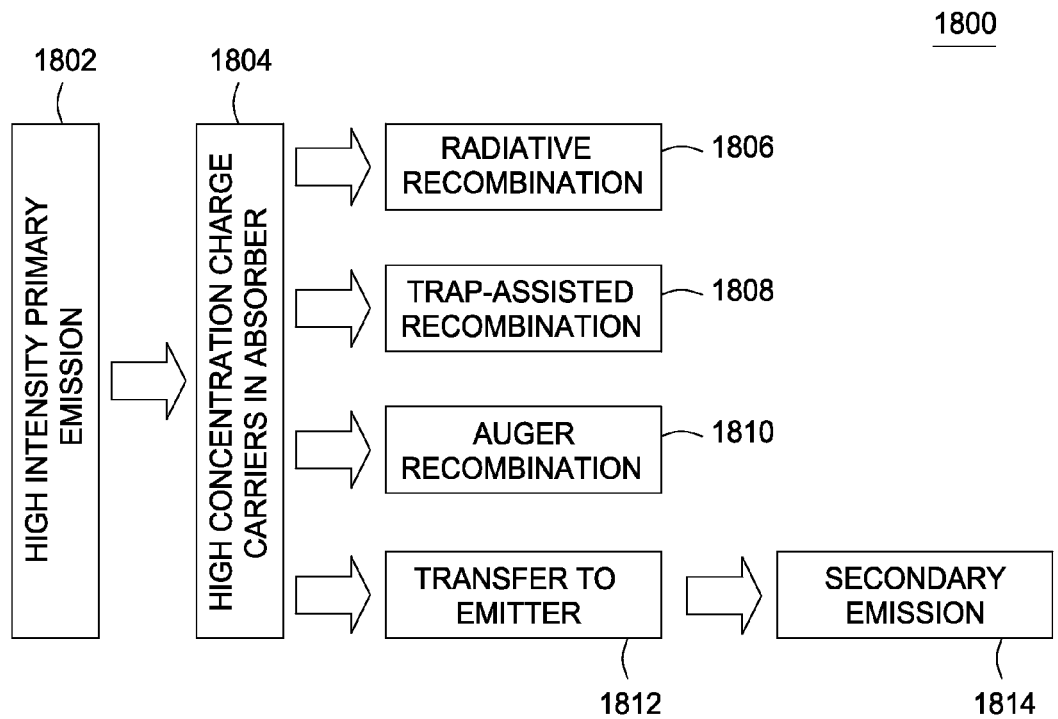
FIG. 18 shows the conversion process from the primary emission to the secondary emission in semiconductor materials at high primary emission intensities.

FIG. 18 illustrates another embodiment of a photo-restricting method 1800, which is similar to the photo-restricting method 1700, except for the primary emission intensity in this case is much higher than that in method 1700. At step 1802, a high-intensity primary emission is first absorbed. As a result, in method 1800 the primary emission absorption results in a much higher carrier concentration (step 1804). The charge carriers may recombine via the same recombination paths; however, because of their much higher concentration, the relative rates of radiative recombination (1806), non-radiative trap-assisted radiation (1808), non-radiative Auger recombination (1810) and charge transfer to an emitter (1812) are different as illustrated by the different sizes of the arrows describing corresponding relaxation channels in FIGS. 17 and 18. This behavior of recombination rates may be exploited to produce the secondary emission (1814) saturation phenomenon.

Figure 19:
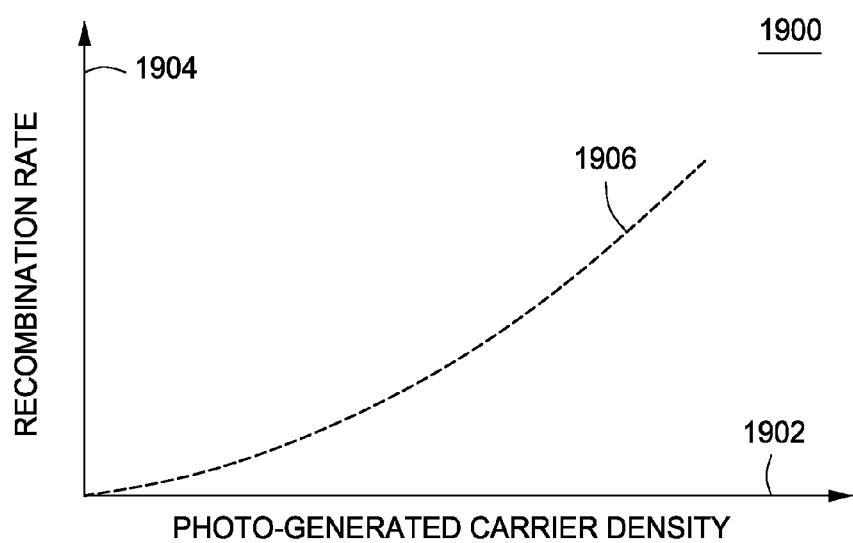
FIG. 19 shows schematically the carrier density dependence of the recombination rate.

For example, the radiative recombination and Auger recombination rates increase at high carrier concentrations, as shown in FIG. 19. FIG. 19 shows a graph 1900 having an x-axis 1902 representing photo-generated carrier density, and a y-axis 1904 representing recombination rate. As shown by the curve 1906, the radiative recombination rate may increase as $N^2$ and the Auger recombination rate may increase as $N^3$, where N is the carrier concentration. Thus even if the charge transfer rate to the emitter remains constant at high carrier concentrations, its relative contribution with respect to other relaxation paths in the absorber diminishes. As a result, an increasingly larger number of carriers recombine in the absorber at high primary emission intensities before they are transferred to the emitter. A similar effect may be used in the emitter section, where at high carrier concentration non-radiative Auger recombination rate increases faster with respect to that of the radiative recombination. The secondary emission at high intensities may be suppressed in this case by increasing non-radiative Auger recombination in the emitter material.

Figure 20:
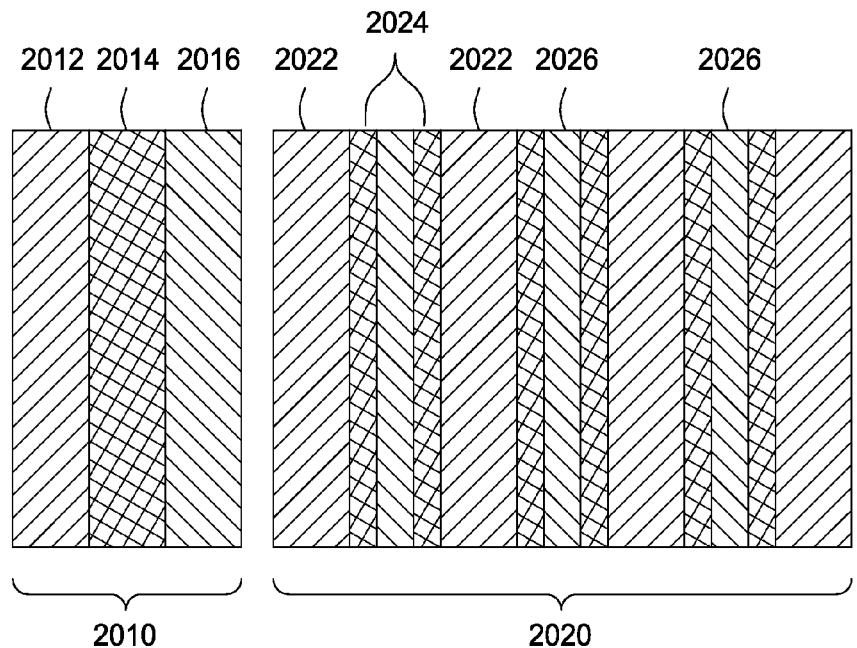
FIG. 20 shows embodiments of photorestrictors with buffer sections.

In accordance embodiments of the invention, a photo-restricting method and a photorestrictor apparatus described above may be modified to include other materials and other sections. For example, FIG. 20 shows an exemplary photorestrictor 2010, which includes at least one absorber section 2012, at least one buffer section 2014 and at least one emitter section 2016. In this case the absorber 2012 and the emitter 2016 are not attached or connected directly to each other. Instead, a different buffer material is used to provide the connection between the absorber and the emitter sections. The buffer 2014 provides the transfer path for the transfer of excitations between the absorber and the emitter materials. It may improve the forward transfer from the absorber to the emitter, while impeding the backward transfer—from the emitter back to the absorber. In some cases the transfer rates may be different for electrons and holes, respectively. In these cases the buffer may be used to selectively affect the transfer rate of either the electrons or the holes, separately. The buffer layers may be also used to improve quantum confinement in quantum-sized emitter sections, such as quantum wells. The buffer sections may be also used for exciton dissociation to realize a more energy efficient transfer between the absorber and the emitter. The buffer layers may be also used for surface passivation to minimize the amount of traps at the interfaces between the absorber and emitter materials. FIG. 20 also shows another photorestrictor 2020, which includes multiple absorber sections 2022, buffer sections 2024 and emitter sections 2026. At least some of these sections may be produced as thin layers, wires or dots. It may be preferred that thickness of either the buffer or the emitter sections is smaller than the thickness of the absorber sections.

The buffer sections may be produced from the materials similar to the materials used in the absorber and emitter sections. For example, a buffer may be produced from a compound semiconductor having the same or similar constituent elements as compound semiconductors used to produce either the absorber, the emitter or both. This choice of a buffer material minimizes the lattice mismatch between different materials, i.e. those of the absorber, emitter and buffer, and consequently reduces strain and potential defects at the boundaries between these layers. Alternatively, a different semiconductor material may be used, which is especially useful in case when the absorber and the emitter are made from two different semiconductors with substantially mismatched crystalline lattices. In this case it may be impossible to grow the emitter layer directly on the absorber layer and vice versa. Thus a buffer layer may be introduced between the absorber and the emitter layers produced from a compound semiconductor with a graded composition, in which the lattice parameter is gradually changed to match the lattice parameter of the absorber material on one side and the lattice parameter of the emitter material on the other side.

Figure 21:
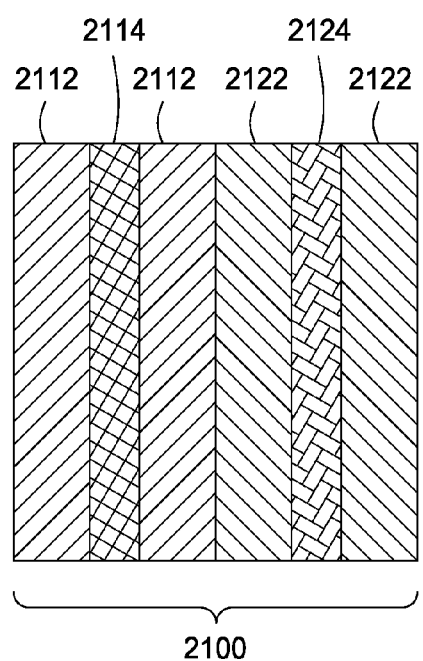
FIG. 21 shows a photorestrictor with multiple absorber/emitter sections.

In accordance embodiments of the invention, a photo-restricting method and a photorestrictor apparatus described above may be modified to include other materials and other sections. For example, FIG. 21 shows a photorestrictor 2100, which includes a first absorber section 2112, a first emitter section 2114, a second absorber section 2122 and a second emitter section 2124. The first and second absorber sections may be produced from respectively different materials. Similarly, the first and second emitter sections may be produced from respectively different materials. The photorestrictor 2100 may absorb primary emission from an external light source to generate photoexcited states in the absorber 2112, transfer their energy to the emitter 2114 and produce secondary emission. The secondary emission produced by the emitter 2114 may be then absorbed by the absorber 2122 to generate different photo-excited states, transfer their energy to the emitter 2124 and produce tertiary emission. The absorption spectrum of the absorber 2122 overlaps the emission spectrum of the emitter 2114. It may be preferred that the mean wavelength of the tertiary emission is longer than the mean wavelength of the secondary emission. The relation between the intensity of the tertiary emission and the primary emission may be characterized by a transfer function similar to that of FIG. 2. At least one or more of the photo-generation and energy transfer processes in the photorestrictor 2100 may be used to produce a restricting transfer function. A similar photorestricting approach with multiple absorber/emitter combinations may be used in order to convert the primary emission to quaternary, quinary, senary and other types of emissions. For example, to produce a quaternary emission a photorestrictor with three different absorber/emitter sections would be needed.

Figure 22:
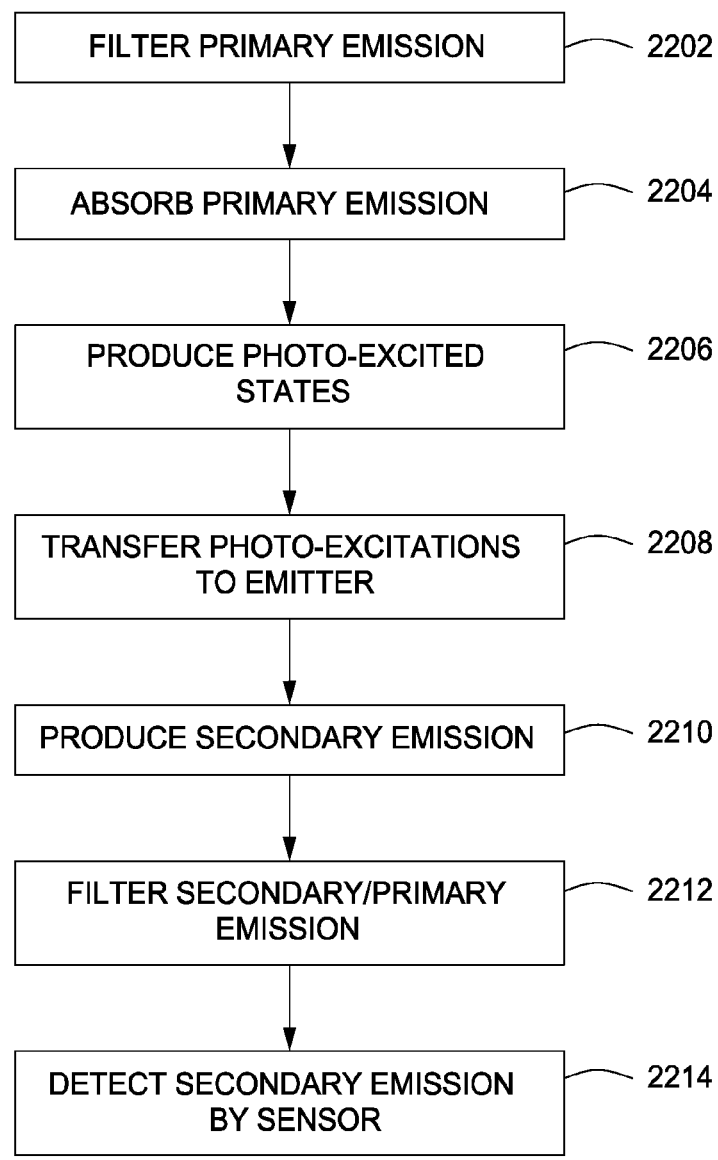
FIG. 22 shows a photorestricting method.

In accordance embodiments of the invention, an optical sensing method 2200 shown in FIG. 22 is provided. The method 2200 begins at optional step 2202, where a primary emission is filtered. At step 2204, a primary emission is absorbed. At step 2206, photo-excited states are produced in an absorber. At step 2208, the photo-excited states are transferred to an emitter. At step 2210, a secondary emission is transferred. At optional step 2212, either the primary emission or the secondary emission or both is/are filtered. At step 2214, the secondary emission is detected by an optical sensor. In general, the photo-excited states in the absorber and the emitter may be neutral or charged, localized or delocalized. In some materials, excitons may be produced that are neutral and localized. In other materials, charged carriers may be photo-generated that are charged and delocalized.

Figure 23:
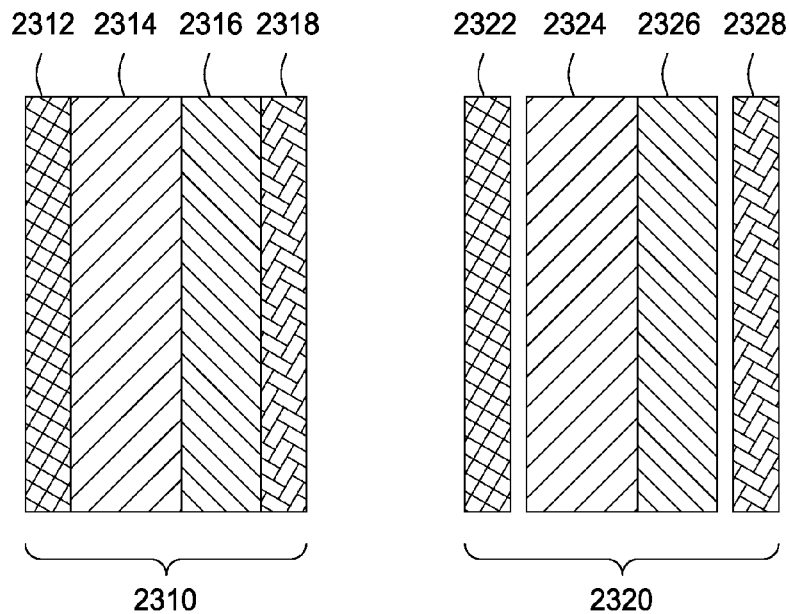
FIG. 23 shows embodiments of photorestrictors with filters.

Depending on the nature of the photo-excited states, at least two variations of the method 2200 are possible, in which either excitons or electron-hole pairs are generated respectively. FIG. 23 shows possible implementations and means to accomplish the method 2200. A photo-restrictor 2310 shown in FIG. 23 includes an optical filter 2312, an absorber 2314, an emitter 2316 and an optional optical filter 2318 based on optical absorption and/or reflection. These elements are attached to each other and integrated to produce a single stand-alone device. Alternatively, a photo-restrictor 2320 shown in FIG. 23 may include an optical filter 2322, an absorber 2324, an emitter 2326 and an optical filter 2328, in which the filters 2122 and 2128 are separated from the absorber and the emitter sections. Optical filters 2312 and 2322 may be short-pass optical filters, which reflect or absorb the long-wavelength portion of the primary emission while transmitting the short-wavelength portion of the primary emission. The transmission window of these filters can be within the absorption band of the absorbers 2314 and 2324. The emission spectra of the emitters 2316 and 2326 can be within the reflection spectrum of filters 2312 and 2322, respectively. Similarly, optional optical filters 2312 and 2322 may be short-pass optical filters, which reflect or absorb the long-wavelength portion of the primary emission while transmitting the short-wavelength portion of the primary emission.

Figure 24:
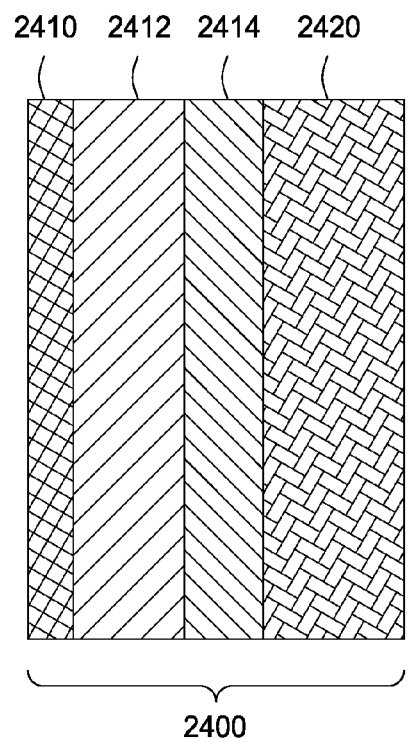
FIG. 24 shows a nonlinear optical sensor.

FIG. 24 shows another embodiment of the method 2200, in which an optical sensing apparatus 2400 is described. The apparatus 2400 includes an optical filter 2410, an absorber 2412, an emitter 2414 and an optical sensor 2420, which are connected to each other and integrated to produce a single stand-alone unit. The filter 2410 may be a short-pass filter or a band-pass filter, which allow passing of only a fraction of primary emission that spectrally overlaps with the absorption band of the absorber 2412. At the same time, the filter 2410 may be used to reflect at least some of the backward propagating secondary emission produced by the emitter 2414. The forward propagating secondary emission is then collected and detected by the optical sensor 2420. The sensor 2420 may be an optical detector or an imaging device. The filter 2410, absorber 2412 and emitter 2414 may be directly deposited onto the sensor 2420. Alternatively, they may be glued, laminated, soldered, fused, bonded, or attached by other means to produce a single unit.

Figure 25:
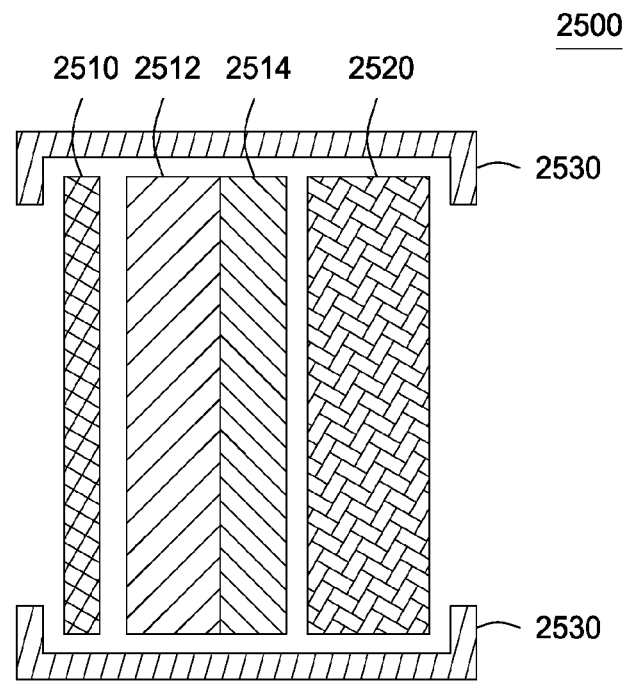
FIG. 25 shows another nonlinear optical sensor.

An optical sensing apparatus 2500 shown in FIG. 25 includes an optical filter 2510, an absorber 2512, an emitter 2514 and an optical sensor 2520, which are held together by a holder, brackets, braces or other mechanical supports 2530. The sensor 2520 may be a PIN detector, an optical receiver, an avalanche detector, a photomultiplier tube, a CCD device, a CMOS sensor or any other imaging sensor array.

Figure 26:
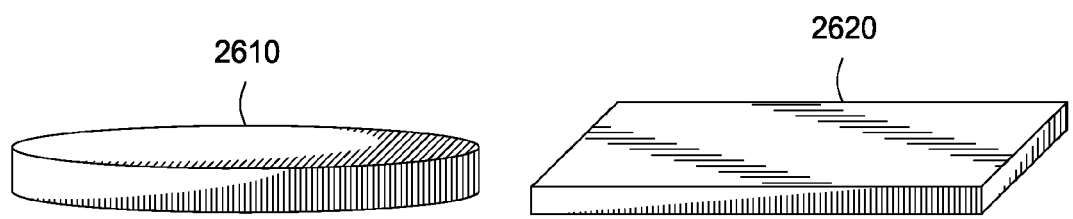
FIG. 26 shows embodiments of photorestrictors with different shapes.

In accordance embodiments of the invention, a photorestrictor apparatus described above may be modified to conform to different physical shapes. For example, FIG. 26 shows photorestrictors 2610 and 2620 shaped like a disk and a square plate, respectively. Of course other three-dimensional forms and shapes may be used in the photorestrictor design. It may be preferred to match the shape of a photorestrictor to the shape of a sensor for which it is used. The shape of a photorestrictor may be rigid or alternatively, it may be flexible and stretchable. A photorestrictor made from a crystalline semiconductor may be rigid, while a photorestrictor based on organic or polymer materials may be flexible. In the latter case, a photorestrictor may be attached to a flexible substrate, such as a plastic film. Alternatively, a photorestrictor may be produced from liquid materials, e.g. organic dies dissolved in a solvent, which may be encased in a rigid or flexible package conforming to arbitrary shapes.

Figure 27:
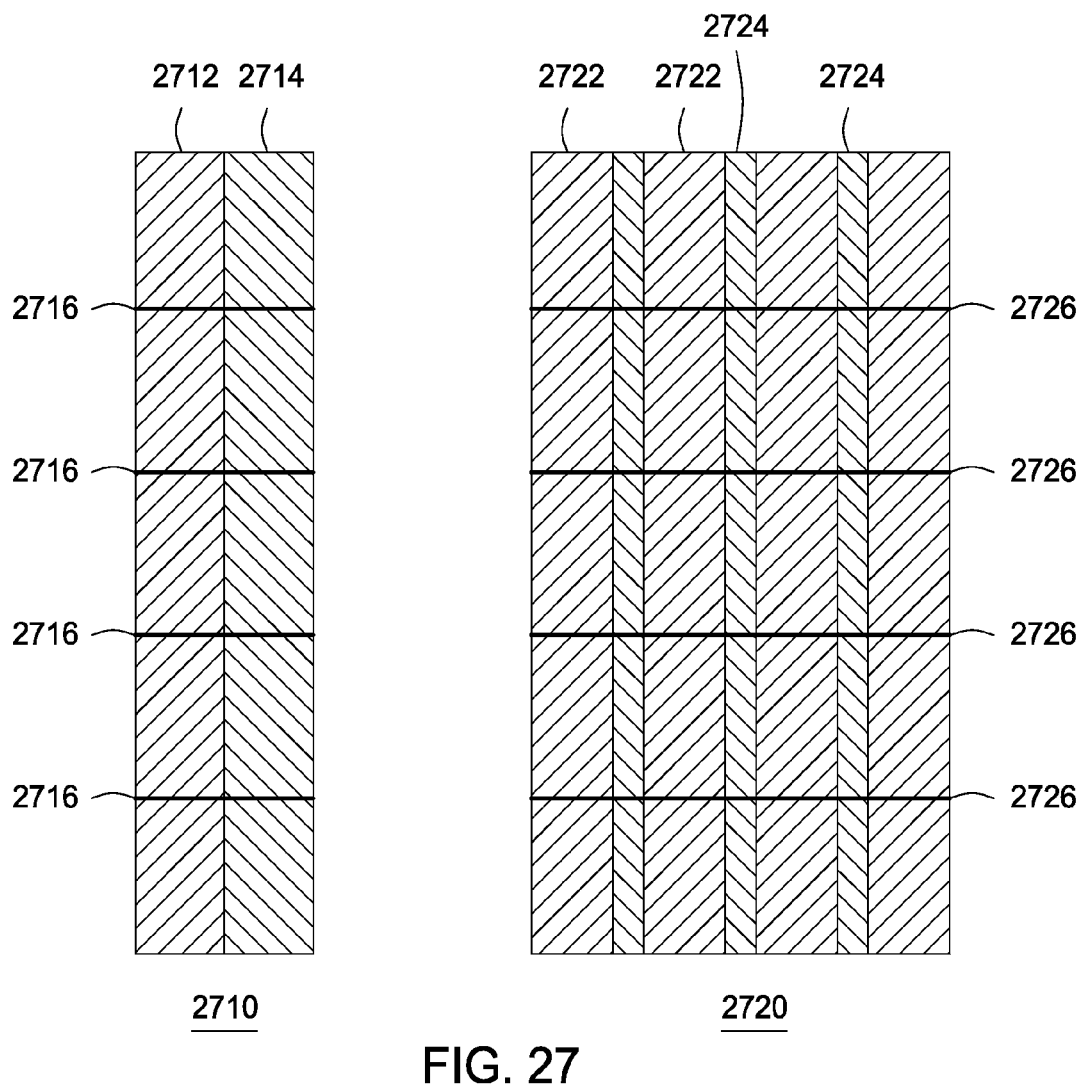
FIG. 27 shows photorestrictors with subsections.

In accordance with embodiments of the invention, a photorestricting method and a photorestrictor apparatus described above may be modified to include other sections. For example, FIG. 27 shows a photorestrictor 2710, which includes an absorber 2712 and an emitter 2714. The absorber and emitter sections are further divided into smaller subsections by separators 2716. The separators 2716 establish at least one of the following: an optical barrier for photons, an energy barrier for excitons, or an electrical barrier for holes and electrons. As a result, the photo-generated carriers and secondary emission may remain confined to each individual subsection of the absorber 2712 and the emitter 2714, respectively. The separators 2716 may be produced by depositing a different material, or alternatively by removing existing material from the absorber and the emitter regions, e.g. by etching or cutting. The separators 2716 may be also produced by modifying the existing absorber and emitter materials, e.g. by ion implantation or doping. FIG. 27 also shows a photorestrictor 2720, which includes multiple absorbers 2722 and emitters 2724. Each absorber and emitter sections may be also further divided into smaller subsections by separators 2726. Both photorestrictors 2710 and 2720 may include sections that are not separated into subsections. The subsections in the photorestrictors 2710 and 2720 may be patterned, so as to produce either a one- or a two-dimensional array of subsections.

Figure 28:
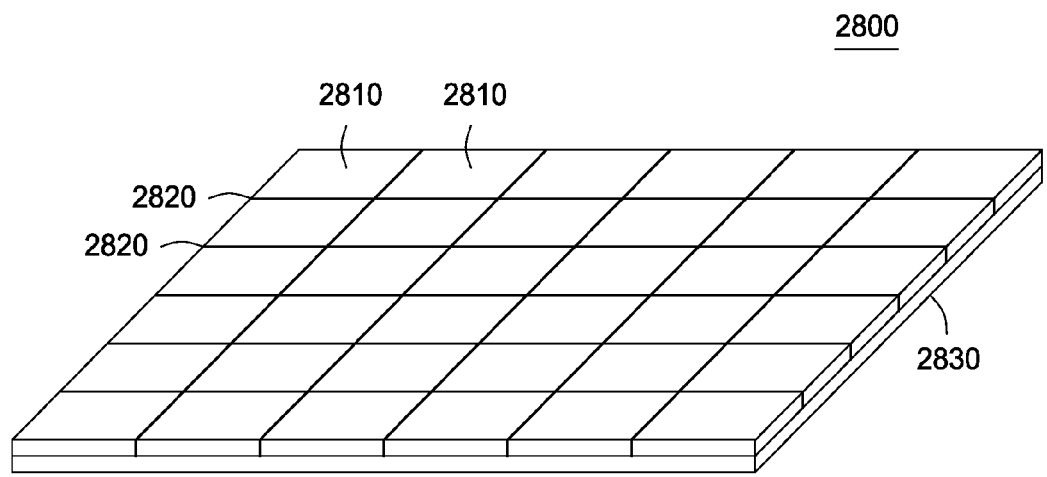
FIG. 28 shows a three-dimensional view of a photorestrictor with subsections.

For example, FIG. 28 shows a photorestrictor 2800, which includes a rectangular array of subsections 2810 that are divided by separators 2820, both of which are attached to a common substrate 2830 maintaining the mechanical integrity of the device. Each subsection 2810 includes at least one absorber subsection and at least one emitter subsection. Of course, other patterns may be used in sectioning of a photorestrictor. A specific pattern may be produced to match a specific optical sensor. For example, an imaging sensor array, such as a CCD array, may have a one- or a two-dimensional array of pixels. It may be preferable to match the size and the subsectioning pattern of a photorestrictor to those of the sensor array pixels.

Figure 29:
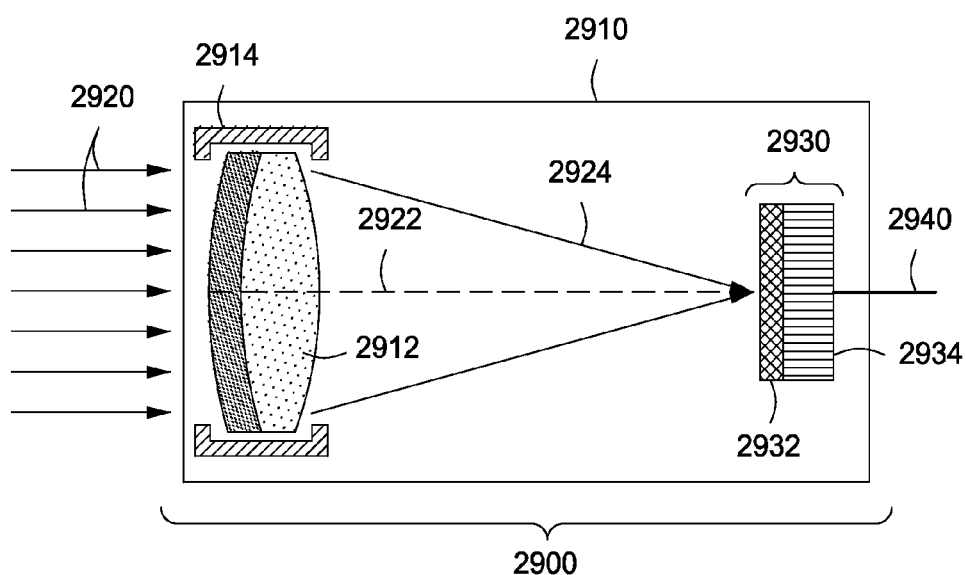
FIG. 29 shows a nonlinear imaging system.

In accordance with embodiments of the invention, an optical imaging system 2900 is provided as shown in FIG. 29, e.g. for use in photo- and video-cameras. The system includes a mechanical body 2910, an imaging optics 2912, an optical holder with an optional optical baffle 2914, a nonlinear imaging sensor 2930 comprised of a photorestrictor 2932 and an electronic sensor 2934, and an electrical output cable 2940. The imaging optics 2912, such a lens or a lens assembly, is used to collimate and focus a primary emission 2920 from an imaged object onto the nonlinear sensor 2930. The sensor 2930 is positioned in the focal point of the imaging optics 2912 on its optical axis 2922, so that an image of the object may be produced on its surface. The response of the sensor 2930 may be extracted as an electrical signal via the cable 2940. The photorestrictor 2932 modifies the response of the electronic sensor 2934, so that the overall response of the nonlinear imaging sensor 2930 is determined by the product of the photorestrictor 2932 transfer function and the response function of the sensor 2934. The response function of the sensor 2934 in turn is determined by the ratio of the sensor response, such as for example its photocurrent, to the intensity of the detected light. Typically, an optical sensor response function is a linear function of the light intensity. However, a combined response function of the nonlinear imaging sensor 2930 may be a nonlinear function, similar in its functional form to those of FIG. 2. As a result, the light from high brightness objects will be effectively attenuated, so that both high and low brightness objects may be viewed simultaneously. Furthermore, the sensor 2934 may be protected from over-illumination and signal overloading caused by high brightness objects.

Figure 30:
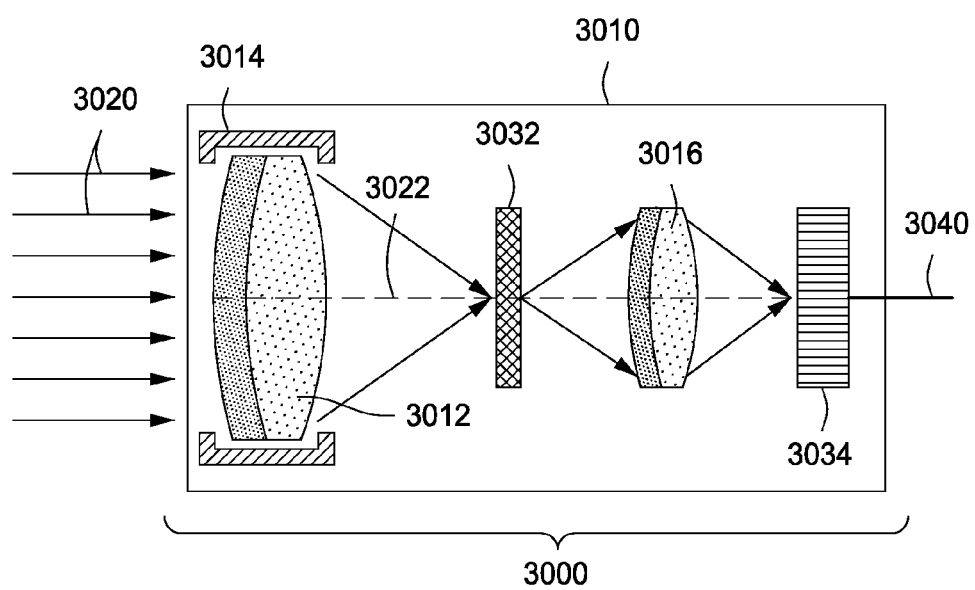
FIG. 30 shows an optical imaging system.

Alternatively, an optical imaging system 3000 may be provided as shown in FIG. 30. The system includes a mechanical body 3010, a first imaging optics 3012, an optical holder with an optional optical baffle 3014, a second imaging optics 3016, a photorestrictor 3032, an imaging sensor 3034 and an electrical output cable 3040. The optical elements, the photorestrictor 3032 and the sensor 3034 are aligned and centered on an optical axis 3022. The primary imaging optics 2912, such as an objective lens, is used to focus a primary emission 3020 from an object to produce its image (a primary image) on the photorestrictor 3032, which as a result produces a secondary emission. The secondary imaging optics is then used to focus the secondary emission from the photorestrictor 3032 and produce a secondary image on the sensor 3034. The sensor response is then provided via the cable 3040 as a digital or an analog electrical signal.

Figure 31:
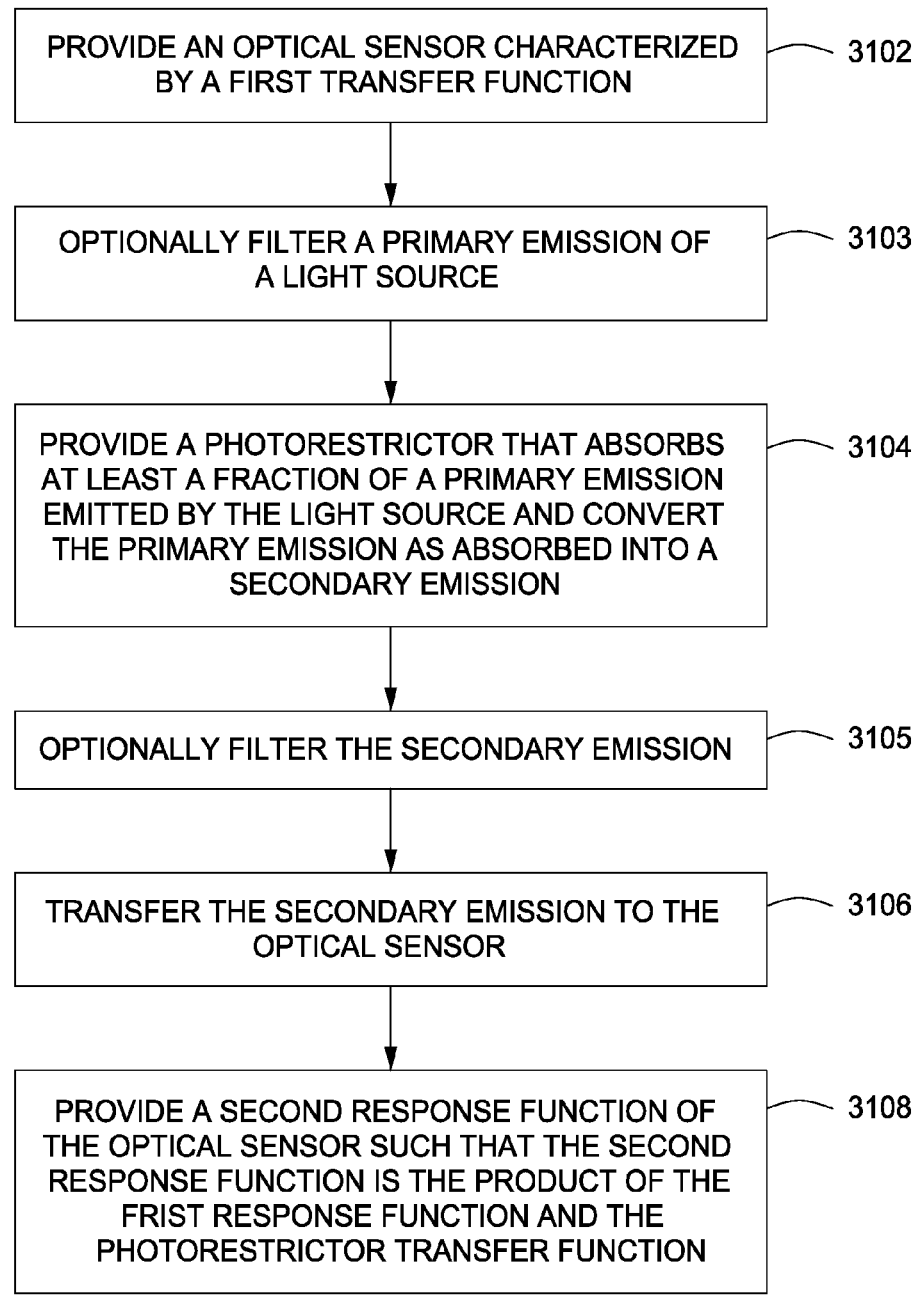
FIG. 31 is a flow diagram depicting a method of modifying the response of an optical sensor according to aspects of the invention.

FIG. 31 is a flow diagram depicting a method 3100 of modifying the response of an optical sensor according to aspects of the invention. The method 3100 begins at step 3102, where an optical sensor is provided characterized by a first response function. At step 3104, a photorestrictor is provided that absorbs at least a fraction of a primary emission emitted by a light source and converts the primary emission as absorbed into a secondary emission. The photorestrictor is characterized by a transfer function such that the secondary emission intensity saturates at increasing primary emission intensity. At step 3106, the secondary emission is transferred to the optical sensor. At step 3108, a second response function of the optical sensor is provided, wherein the second response function is the product of the first response function and the photorestrictor transfer function.

In some embodiments, the mean wavelength of the secondary emission is greater than the mean wavelength of the absorbed primary emission. In some embodiments, the photorestrictor produces first photoexcitations, transfers a limited number of first photoexcitations into second photoexcitations and produces the secondary emission. In some embodiments, optional step 3103 and/or optional step 3105 provide optical filtering of the primary and/or secondary emissions, respectively.

Figure 32:
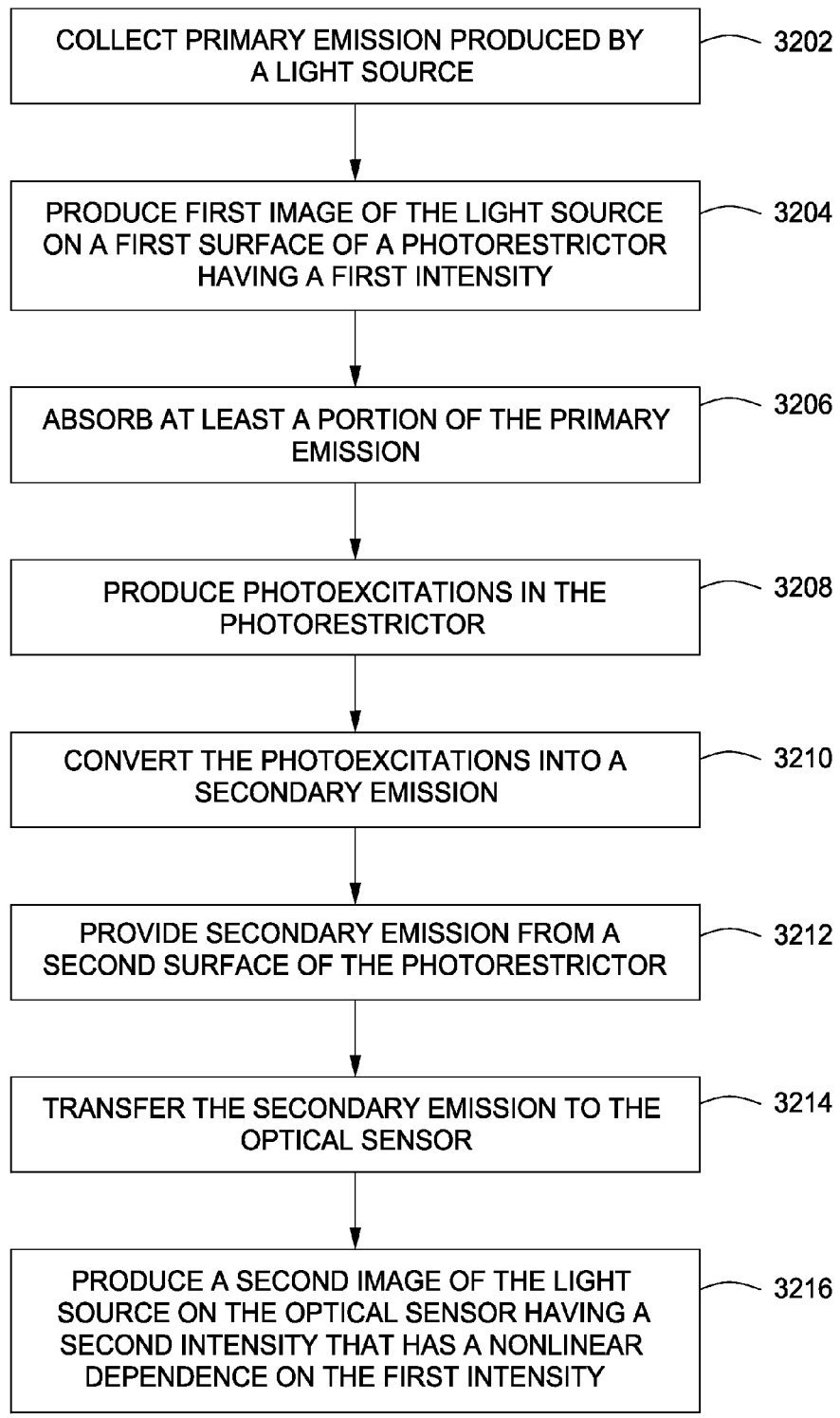
FIG. 32 is a flow diagram depicting a method of producing a nonlinear image of a light source according to embodiments of the invention.

FIG. 32 is a flow diagram depicting a method 3200 of producing a nonlinear image of a light source. The method 3200 begins at step 3202, wherein a primary emission produced by the light source is collected. At step 3204, a first image of the light source is produced on a first surface of a photorestrictor, where the primary emission includes a first intensity. At step 3206, at least a portion of the primary emission is absorbed. At step 3208, photoexcitations are produced in the photorestrictor. At step 3210, the photoexcitations are converted in the photorestrictor. At step 3212, a secondary emission is produced from a second surface of the photorestrictor. At step 3214, the secondary emission is transferred to the optical sensor. At step 3216, a second image of the light source is produced on the optical sensor, where the second emission includes a second intensity that has a non-linear dependence of the first intensity.

Exemplary specific but non-limiting embodiments of the invention are now described. In an Example 1, a method is provided for restricting the brightness of a light source, which comprises the steps of intercepting a primary emission produced by the light source, substantially absorbing the primary emission using an absorber material, producing photoexcitations in the absorber material, transferring photoexcitations from the absorber material to an emitter material, and producing a secondary emission from the emitter material, so that at least one of the above steps is dependent on the intensity of the primary emission and its efficiency decreases at high primary emission intensities, e.g. at intensities that are larger than 1 kW/m$^2$.

In an Example 2, a photo-restricting method is provided in accordance with Example 1, where the absorption of the absorber material saturates and decreases at high primary emission intensities. In this case the absorption saturation may be achieved for example by photo-bleaching of the absorber material. This may be accompanied by at least a partial optical inversion and a corresponding depletion of its ground state, resulting in an optical transparency within at least a portion of the primary emission spectrum. It may be preferred to have the absorber material with a long excitation lifetime, preferably greater than 10-100 ns, in order to achieve the inversion at primary emission intensities corresponding to typical high brightness objects, such as a light bulb, the moon or the sun.

In an Example 3, a photo-restricting method is provided in accordance with Example 1, where the production of photoexcitations in the absorber material saturates and decreases at high primary emission intensities. In this case the absorption saturation may be achieved for example by photo-bleaching of the absorber material. This may be accompanied by at least a partial optical inversion and a corresponding depletion of its ground state, resulting in an optical transparency within at least a portion of the primary emission spectrum. It may be preferred to have the absorber material with a long excitation lifetime, preferably greater than 10-100 ns, in order to achieve the inversion at primary emission intensities corresponding to typical high brightness objects, such as a light bulb, the moon or the sun.

In an Example 4, a photo-restricting method is provided in accordance with Example 1, where the transfer of photoexcitations from the absorber to the emitter material may saturate and decrease at high primary emission intensities. In this case the lowering of the transfer rate may be accomplished by restricting the number of available emitter excited states, which can be achieved for example by providing a much smaller volume of the emitter as compared to that of the absorber. It may be preferred to provide the emitter volume, which is less than 1% of the absorber volume. Alternatively, the decrease of the transfer rate may be achieved for example by a relative increase in the rate of internal relaxation channels in the absorber, such as radiative and non-radiative recombination. In this case an internal relaxation channel in the absorber, e.g. an Auger recombination process, may have a superlinear dependence on the excitation density, which at least partially suppresses the photoexcitation transfer to the emitter at large primary emission intensities.

In an Example 5, a photo-restricting method is provided in accordance with Example 1, where the relative rate of secondary emission from the emitter material may saturate and decrease at high primary emission intensities. In this case the suppression of the secondary emission may be accomplished by increasing the rate of non-radiative relaxation in the emitter, which can be achieved for example by utilizing an Auger recombination process in the emitter material.

In an Example 6, a photo-restricting method is provided in accordance with Example 1, where the absorber and emitter materials are molecular materials containing π-conjugated oligomers or polymers, in which photoexcitations may be produced in the form of excitons. The emitter material may be an efficient luminescent material, and the absorber material may be either an efficient luminescent material, a poorly luminescent material or even a non-luminescent material. These materials may include for example sexithiophene, tris (8-hydroxy-quinolinato)aluminum, perylene, rubrene, quinacridone, poly(p-phenylene vinylene), polydiacetylene, polyfluorene, their derivatives, and other molecules and polymers. These materials may be provided either in a solid form or in a solution. In the later case the solvent may serve as either the absorber, the emitter or neither.

In an Example 7, a photo-restricting method is provided in accordance with Example 1, where the absorber and emitter materials are semiconductor materials, which include Si, Ge, and compound semiconductors containing at least two of the following chemical elements from group I (Cu, Ag), group II (Mg, Zn, Cd, Hg), group III (B, Al, Ga, In, Tl), group V (N, P, As, Sb), and group VI (S, Se, Te). For example, both the absorber and emitter materials may be based on GaAs semiconductor. Alternatively, at least one of the absorber and emitter materials may be based on $CuInGaSe_2$.

In an Example 8, a photo-restricting method is provided in accordance with Example 1, where the absorber material is characterized by an optical absorption cut-off wavelength $\lambda_a$ and the emitter material is characterized by a mean emission wavelength $\lambda_e$. It is preferable to provide $\lambda_e$ that is larger than $\lambda_a$, so that the difference between $\lambda_e$ and $\lambda_a$ is larger than the half of the secondary emission spectral width. For example, for the secondary emission bandwidth of 30 nm, the difference between $\lambda_e$ and $\lambda_a$ may be 15 nm or larger.

In an Example 9, a photo-restricting method is provided in accordance with Example 1, which further includes one or more steps of optical filtering. The optical filtering step may primarily affect the primary emission, although it may also be used to modify the secondary emission. The optical filtering step may be used to alter the primary emission spectrum before the step of absorbing the primary emission in the absorber. The optical filtering step may be also used after the step of producing the secondary emission in order to filter out the remainder of the primary emission unabsorbed by the absorber. The optical filtering step may be accomplished by a short-pass or a bandpass filter, characterized by a long cut-off wavelength $\lambda_f$ that is shorter than the absorber absorption cut-off wavelength $\lambda_a$. As a result, the portion of the primary emission may be intercepted that spectrally overlaps with the absorption band of the absorber material.

In an Example 10, a photo-restricting method is provided in accordance with Example 1, which further includes the step of transmitting the secondary emission from the emitter to an optical sensor. The sensor may be an imaging array, such as a CCD array or a CMOS sensor array. An imaging optics may be used between the emitter and the sensor to collect secondary emission and focus it onto the sensor, thus producing an image of the emitter surface on the surface of the sensor. Alternatively, a free-space transfer of secondary emission may used. In this case it may be preferred to position the emitter closely to the optical sensor, in order to limit optical losses and a potential loss in the imaging resolution. For example, it is preferable to have a distance between the emitter and the sensor of less than the sensor pixel size, e.g. 6 microns.

In an Example 11, a photo-restricting method is provided in accordance with Example 1, which further includes the step of producing an image of the primary emission source on the front surface of the absorber material. This step may be accomplished by using an imaging optics, e.g. an objective lens.

In an Example 12, a photorestrictor apparatus is provided for restricting the brightness of a light source, which includes at least one absorber section and at least one emitter section. The absorber section material is able to absorb optical emission and produce photoexcitations. Also, a transfer path is provided for the photoexcitations, e.g. via a direct contact, to be transported from the absorber section to the emitter section. The emitter material is able to produce secondary optical emission via electronic relaxation of transferred photoexcitations. The generation of photoexcitations in the absorber, their transfer to the emitter and their subsequent relaxation in the emitter may be modified at excitation densities above about $10^{16}$-$10^{17}$ $cm^{-3}$ using the nonlinear behavior of competing relaxation paths, so that the relative rate of the secondary emission decreases as the absorber photoexcitation density increases.

In an Example 13, a photorestrictor apparatus is provided in accordance with Example 12, where the absorber and the emitter materials have different optical gaps, so that the absorber gap is larger than the emitter gap. For example, the absorber material may have an optical gap of about 1.25-1.35 eV and the emitter material may have an optical gap of about 1.1-1.2 eV.

In an Example 14, a photorestrictor apparatus is provided in accordance with Example 12, where the absorber material is characterized by an optical absorption cut-off wavelength $\lambda_a$ and the emitter material is characterized by a mean emission wavelength $\lambda_e$. It is preferable to provide $\lambda_e$ that is larger than $\lambda_a$, so that the difference between $\lambda_e$ and $\lambda_a$ is larger than the half of the secondary emission spectral width. For example, for $\lambda_a$ of about 750-900 nm the secondary emission may be centered at about $\lambda_e$ of about 900-1050 and have a full-width at half-maximum (FWHM) of about 10-50 nm.

In an Example 15, a photorestrictor apparatus is provided in accordance with Example 12, which may also include a short-pass or a bandpass filter, characterized by a long cut-off wavelength $\lambda_f$ that is shorter than the absorber absorption cut-off wavelength $\lambda_a$. For example, for $\lambda_a$ of about 750-900 nm $\lambda_f$ may be about 700-850 nm, respectively.

In an Example 16, a photorestrictor apparatus is provided in accordance with Example 12, where the absorber and emitter materials are molecular materials containing π-conjugated oligomers or polymers. For example, these materials may include for example sexithiophene, tris(8-hydroxy-quinolinato)aluminum, perylene, rubrene, quinacridone, poly(p-phenylene vinylene), polydiacetylene, polyfluorene, their derivatives, and other molecules and polymers. These materials may be provided either in the form of a solid film or a solution.

In an Example 17, a photorestrictor apparatus is provided in accordance with Example 12, where the absorber may be produced from monocrystalline GaAs with a bandgap of about 1.42 eV. The emitter can be epitaxially grown as thin layers of $In_{0.18}Ga_{0.82}As$ with a bandgap of about 1.25 eV, producing multiple quantum wells (MQW). Carrier lifetimes in this type of MQWs may be about 1-10 ns, which can result in high (>50%) quantum conversion efficiencies between the primary and secondary emissions. Such a MWQ structure may be used as is, i.e. as grown on a wafer with a typical thickness in the range of 100-300 μm. Alternatively, it may be "lifted-off" from the GaAs wafer and bonded to a secondary transparent substrate, such as glass, sapphire or plastic. As s result, the total thickness of the absorber and the emitter can be reduced to a few microns.

In an Example 18, a photorestrictor apparatus is provided in accordance with Example 12, where the emitter comprises quantum dots dispersed in the absorber material. Quantum dots may be produced from various semiconductor materials, including Si, Ge, SiGe alloys, GaAs-based alloys (e.g. AlGaAs and InGaAs), CdSe-based alloys and others. Quantum dots may have a characteristic diameter of less than 100 nm and a monolayer surface density of about $10^{10}$ cm$^{-2}$.

In an Example 19, a photorestrictor apparatus is provided in accordance with Example 12, where the absorber material comprises amorphous Si, Ge, SiGe alloy, or SiH alloy. The emitter material in this case may be nano- or micro-crystalline Si, Ge, SiGe alloy, SiH alloy, similar and other alloys. The composition of the emitter material in this case may be different from the absorber material to ensure that a highly luminescent, excited state exists in the emitter material with a lower energy than that of the absorber material.

In an Example 20, a photorestrictor apparatus is provided in accordance with Example 12, where the transfer path is provided via a buffer material. For example, in case the absorber material is GaAs, the buffer material may be GaAs-based alloy.

In an Example 21, a nonlinear optical converter is provided for converting a primary emission from a light source to a secondary emission, where the dependence of the secondary emission intensity on the primary emission intensity is characterized by a restricting transfer function. A restricting transfer function has a sublinear dependence on the primary emission intensity for intensities larger than 1 kW/m$^2$. It is preferred that the transfer function magnitude is limited and capped below a maximum secondary emission intensity. The optical conversion process of the primary emission to the secondary emission is achieved via a photo-generation of energy and its transfer from one part of the converter (an absorber) to another part of the converter (an emitter), and a subsequent radiation of the transferred energy as the secondary emission.

In an Example 22, a nonlinear optical converter is provided in accordance with Example 21, where a restricting transfer function is achieved by providing an emitter volume that is much smaller than the absorber volume. It may be preferred that the emitter volume is less than 1% of the absorber volume.

In an Example 23, a nonlinear optical converter is provided in accordance with Example 21, where a restricting transfer function is achieved by providing an absorber material with a large Auger recombination rate, e.g. about $10^6$-$10^9$ sec$^{-1}$, at excitation densities above about $10^{16}$-$10^{17}$ cm$^{-3}$.

In an Example 24, a nonlinear optical sensor is provided for sensing an emission (a primary emission) from a light source, where the response of the sensor to the light intensity is characterized by a sublinear response function. The sublinear response function is realized by using either a photorestrictor in accordance with embodiment 12 or a converter in accordance with embodiment 20, which are placed in front of a linear optical sensor. The linear sensor may be a Si-based CCD array. Accordingly, the photorestrictor or the converter may convert the primary emission into the secondary emission at optical wavelengths within the sensor spectral responsivity. It may be preferred to provide the secondary emission at wavelengths corresponding to the maximum responsivity, e.g. at about 900-1000 nm.

In an Example 25, a nonlinear optical imaging system is provided for imaging an object, which includes an imaging optics and a nonlinear optical sensor in accordance with Example 24. The imaging optics may include an objective lens producing an image of the object on a front surface of the nonlinear sensor, such as the front surface of the absorber section of the photorestrictor

CONCLUSION

Variations of the method, apparatus and system described above are possible without departing from the scope of the invention. In view of the wide variety of embodiments that can be applied, it should be understood that the illustrated embodiments. In addition, those skilled in the art will appreciate that the present invention has applicability in many arenas. The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Exemplary embodiments have been illustrated and described. Further, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method of restricting the brightness of a light source, comprising:
    absorbing, in absorber material of a photo-restrictor, at least a portion of a primary emission produced by the light source;
    producing first photoexcitations in the absorber material characterized by a first excitation density;
    transferring the first photoexcitations from the absorber material to an emitter material of the photo-restrictor thereby producing second photoexcitations characterized by a second excitation density; and
    producing a secondary emission from the emitter material.

2. The method of claim 1, wherein the absorber material and the emitter material comprise excitonic material, and wherein the photoexcitations comprise excitons.

3. The method of claim 1, wherein the absorber material and the emitter material comprise semiconductor materials, and wherein the photoexcitations comprise charge carriers.

4. The method of claim 1, wherein the step of producing the photoexcitations comprises:
    producing excitons in the absorber material; and
    disassociating the excitons into charge carriers.

5. The method of claim 1, further comprising:
    filtering the primary emission prior absorption by the absorber material of the photo-restrictor.

6. The method of claim 1, further comprising:
    filtering at least one of the primary emission or the secondary emission.

7. The method of claim 1, further comprising:
    providing the secondary emission to an optical sensor.

8. The method of claim 1, further comprising:
    providing a variable rate for the transfer of first photoexcitations from the absorber material to the second photoexcitations in the emitter material.

9. The method of claim 8, wherein the variable rate for the transfer of photoexcitations decreases with the increasing primary emission intensity.

10. The method of claim 8, wherein the variable rate for the transfer of photoexcitations decreases with the increasing first excitation density.

11. The method of claim 8, wherein the variable rate for the transfer of photoexcitations decreases with increasing second excitation density.

12. The method of claim 1, further comprising:
providing a variable secondary emission rate.

13. The method of claim 12, wherein the variable secondary emission rate is characterized by a transfer function that is a decreasing function versus the primary emission intensity.

14. The method of claim 13, wherein the variable secondary emission rate is characterized by a transfer function that is a decreasing function versus the second excitation density.

15. The method of claim 1, further comprising:
providing a variable generation rate of the first photoexcitations.

16. The method of claim 15, wherein the variable generation rate of the first photoexcitations decreases with increasing primary emission intensity.

17. A method of modifying the response of an optical sensor, comprising:
providing an optical sensor characterized by a first response function;
providing a photorestrictor, wherein the photorestrictor absorbs at least a fraction of a primary emission emitted by a light source and converts the primary emission as absorbed into a secondary emission, the photorestrictor being characterized by a transfer function such that secondary emission intensity saturates at increasing primary emission intensity;
transferring the secondary emission to the optical sensor; and
providing a second response function of the optical sensor, wherein the second response function is the product of the first response function and the photorestrictor transfer function.

18. The method of claim 17, wherein the mean wavelength of the secondary emission is greater than the mean wavelength of the absorbed primary emission.

19. The method of claim 17, wherein the photorestrictor produces first photoexcitations, transfers a limited number of first photoexcitations into second photoexcitations and produces the secondary emission.

20. The method of claim 17, further comprising optical filtering of at least one of the primary or the secondary emission.

21. A method of producing a nonlinear image of a light source, comprising:
collecting a primary emission produced by the light source and producing a first image of the light source on a first surface of a photorestrictor, wherein the primary emission includes a first intensity;
absorbing at least a portion of the primary emission and producing photoexcitations in the photorestrictor;
converting the photoexcitations in the photo-restrictor and producing a secondary emission from a second surface of the photorestrictor; and
transferring the secondary emission and producing a second image of the light source on an optical sensor; wherein the secondary emission includes a second intensity that has a nonlinear dependence on the first intensity.

\* \* \* \* \*